United States Patent
Aleksov et al.

(10) Patent No.: US 10,969,576 B2
(45) Date of Patent: Apr. 6, 2021

(54) PIEZO ACTUATORS FOR OPTICAL BEAM STEERING APPLICATIONS

(71) Applicant: Intel Corporation, Santa Clara, CA (US)

(72) Inventors: Aleksandar Aleksov, Chandler, AZ (US); Feras Eid, Chandler, AZ (US); Sasha N. Oster, Marion, IA (US); Shawna M. Liff, Scottsdale, AZ (US); Johanna M. Swan, Scottsdale, AZ (US); Thomas L. Sounart, Chandler, AZ (US); Baris Bicen, Chandler, AZ (US); Valluri R. Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 16/072,164

(22) PCT Filed: Apr. 1, 2016

(86) PCT No.: PCT/US2016/025667
§ 371 (c)(1),
(2) Date: Jul. 23, 2018

(87) PCT Pub. No.: WO2017/171862
PCT Pub. Date: Oct. 5, 2017

(65) Prior Publication Data
US 2019/0025573 A1    Jan. 24, 2019

(51) Int. Cl.
*G02B 26/10* (2006.01)
*G02B 26/08* (2006.01)
*G02B 1/14* (2015.01)

(52) U.S. Cl.
CPC ....... *G02B 26/105* (2013.01); *G02B 26/0858* (2013.01); *G02B 26/101* (2013.01); *G02B 1/14* (2015.01)

(58) Field of Classification Search
CPC ............ G02B 26/105; G02B 26/101; G02B 26/0858; G02B 1/14; G02B 26/0833; G02B 26/0816; G02B 26/10
(Continued)

(56) References Cited

U.S. PATENT DOCUMENTS 6,300,665 B1 * 10/2001 Peeters ............... G02B 6/3518
257/415
6,992,754 B2 * 1/2006 Bleeker ............... G03F 7/70283
355/53
(Continued)

FOREIGN PATENT DOCUMENTS

| JP | 2003-315650 | 11/2003 |
|---|---|---|
| JP | 2007-248225 | 9/2007 |
| WO | WO-2011-121584 | 10/2011 |

OTHER PUBLICATIONS

International Search Report and Written Opinion for International Patent Application No. PCT/US2016/025667 dated Nov. 15, 2016, 14 pgs.
International Preliminary Report on Patentability for International Patent Application No. PCT/US2016/025667, dated Oct. 11, 2018, 11 pages.

*Primary Examiner* — Jade R Chwasz
(74) *Attorney, Agent, or Firm* — Schwabe, Williamson & Wyatt, P.C.

(57) ABSTRACT

Disclosed herein are maskless imaging tools and display systems that include piezoelectrically actuated mirrors and methods of forming such devices. The maskless imaging tool may include a light source. Additionally, the tool may include one or more piezoelectrically actuated mirrors for receiving light from the light source. The piezoelectrically actuated mirrors are actuatable about one or more axes to
(Continued)

reflect the light from the light source to a workpiece positioned to receive light from the piezoelectrically actuated mirror. Disclosed herein is a maskless imaging tool that is a laser direct imaging lithography (LDIL) tool. The maskless imaging tool may also be a via-drill tool. Disclosed herein is also a piezoelectrically actuated mirror used in a projection system. For example, the projection system may be integrated into a pair of glasses.

25 Claims, 13 Drawing Sheets

(58) Field of Classification Search
USPC .......................................................... 359/838
See application file for complete search history.

(56) References Cited

U.S. PATENT DOCUMENTS

| | | | |
|---|---|---|---|
| 7,031,071 B2 | 4/2006 | Nishioka | |
| 2005/0088640 A1* | 4/2005 | Eib | G02B 26/001 |
| | | | 355/77 |
| 2006/0152830 A1* | 7/2006 | Farah | G02B 7/1827 |
| | | | 359/846 |
| 2007/0216878 A1 | 9/2007 | Rouet et al. | |
| 2009/0161197 A1 | 6/2009 | Stowe | |
| 2010/0232043 A1* | 9/2010 | Hishinuma | G02B 26/0875 |
| | | | 359/824 |
| 2015/0205134 A1* | 7/2015 | Bailey | G02B 27/0172 |
| | | | 345/8 |

* cited by examiner

PIEZO ACTUATORS FOR OPTICAL BEAM STEERING APPLICATIONS

CROSS-REFERENCE TO RELATED APPLICATION

This patent application is a U.S. National Phase Application under 35 U.S.C. § 371 of International Application No. PCT/US2016/025667, filed Apr. 1, 2016, entitled "PIEZO ACTUATORS FOR OPTICAL BEAM STEERING APPLICATIONS," which designates the United States of America, the entire disclosure of which is hereby incorporated by reference in its entirety and for all purposes.

FIELD OF THE INVENTION

Embodiments of the present invention relate generally to optical beam steering technologies. In particular, embodiments of the present invention relate to beam steering that is implemented with piezoelectrically actuated mirrors and methods for manufacturing such devices.

BACKGROUND OF THE INVENTION

Maskless lithography has distinct advantages over standard lithography that uses masks and projection optics, especially in the arena of packaging and board manufacturing where the exposure wavelength is still small compared to the critical dimensions (i.e., a wavelength of 355 nm at critical dimensions of 2 µm). Maskless lithography is advantageous because changes to the design can be applied on the fly, allowing for better line density and accommodating misaligned features or components from previous operations.

Laser direct imaging lithography (LDIL) is one group of technologies that may be used in maskless lithography. While LDIL eliminates the need for a mask, one main drawback of LDIL is that the ratio of throughput and resolution or accuracy has not been able to match the same ratio for tools using projection optics and masks. In order to overcome the limited throughput and resolution or accuracy, some systems have employed a rotating multi-faceted mirror coupled to an optics column. The rotating multi-faceted mirror causes the incoming laser to be scanned across the substrate in order to provide a larger patterning surface with each pass. Additionally, in some LDIL systems the rotating mirror may be replaced with an array of acousto-optic deflectors (AODs). However, since AODs are relatively large in size and must include a separate optic column for each beam line, such devices typically do not use more than eight or ten beam lines. A third option for LDIL is to use a digital mirror device (DMD). DMD systems enable high resolution and accurate alignment, but throughput is relatively slow since only the area of the DMD device can be imaged (without any reduction or magnification optics). In order to manufacture a DMD system for LDIL that has adequate throughput, a large array of DMD chips (e.g., greater than 1000 DMDs) is needed.

An additional maskless lithography tool is a laser-drill (or via-drill) tool. Current laser-drill tools use a laser that is guided by two mirrors that are rotated via galvos (i.e., electro-motors). Using galvos is not an ideal solution either. For example, in the pareto of processing time in a typical laser-drill tool, the motion of the galvo actuated mirrors is the most time consuming item. As such, efforts have been made to replace this beam steering method by other methods, such as AODs. However, in addition to the limitations listed above, AOD technology is limited to deflections of less than 5° off center axis. Accordingly, a long working distance/optical column is needed. The long working distance increases the overall size and complexity of the device in addition to reducing the precision and resolution.

Some technologies utilized in maskless lithography may also be used in other projection applications, such as visual displays. One emerging area of projection displays is wearable devices or heads up displays. In some of these projection systems, an array of DMDs may be used to scan a light source between an on state and an off state. Since DMDs are limited to a digital response, an array of DMDs may be needed to produce each desired pixel that will be displayed.

DETAILED DESCRIPTION OF THE INVENTION

Figure 1:
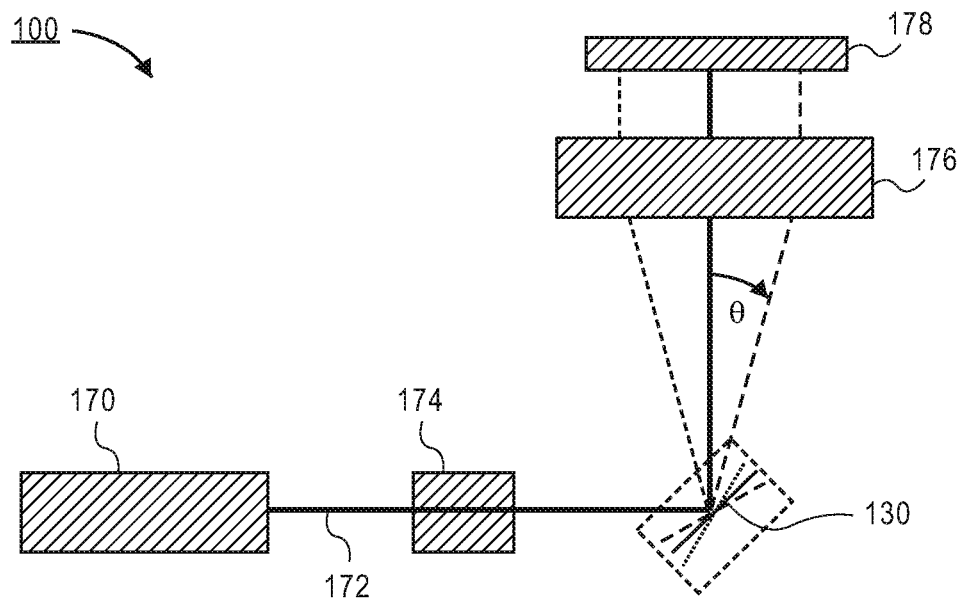
FIG. 1 is a schematic illustration of a beam steering device that includes piezoelectrically actuated mirrors, according to an embodiment of the invention.

Described herein are systems that include a beam steering device that includes piezoelectrically actuated mirrors for reflecting light and methods of forming such devices. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Various operations will be described as multiple discrete operations, in turn, in a manner that is most helpful in understanding the present invention, however, the order of description should not be construed to imply that these operations are necessarily order dependent. In particular, these operations need not be performed in the order of presentation.

Embodiments of the invention include maskless lithography systems and projection displays and methods of making such devices. Devices formed in accordance with embodiments of the invention provide improvements over the maskless lithography and projection systems described above because they include a mirror or an array of mirrors that are driven by piezoelectric actuators. The piezoelectric actuation of mirrors allows for the scanning of an optical beam across a surface. In an embodiment, the piezoelectrically driven mirrors are able to deflect light in an analog manner by controlling the voltage applied to the piezoelectric material. Accordingly, precise and/or continuous scanning of an optical beam that is reflected off of the mirror is made possible, according to embodiments of the invention.

Furthermore, the piezoelectrically driven mirrors formed according to embodiments of the invention may be manufactured using organic package substrate technologies. High performance piezoelectric materials suitable for actuating mirrors according to embodiments described herein, typically require a high temperature anneal (e.g., greater than 500° C.) in order to provide the proper crystal structure to attain the piezoelectric effect. As such, currently available devices that utilize high performance piezoelectric materials require a substrate that is capable of withstanding high temperatures (e.g., silicon or ceramics). However, embodiments of the invention use a laser annealing processes that limits the increase in temperature of the substrate on which the mirrors are formed, so that low temperature organic substrate materials may be used. Manufacturing piezoelectrically actuated mirrors on organic substrates allows for a decrease in the manufacturing cost. For example technologies and materials developed for package/board processing are significantly less expensive than technologies and materials used for semiconductor processing. Fabricating steerable mirrors directly in the substrate or board reduces the cost over silicon MEMS because of the large panel (e.g., 510 mm×515 mm) used for organic substrate and board fabrication, and the less expensive materials and tools used in those systems compared to silicon MEMS.

Embodiments of the invention utilize these piezoelectrically actuated mirrors to produce micromachining tools as well as projection based display technologies. For example, piezoelectrically actuated mirrors may be used to form LDIL tools. The LDIL tools formed in accordance with embodiments of the invention allow for a decrease in size, due to smaller mirrors, fewer optical columns, and a larger range of deflection of the mirrors. Additionally, the high frequency of actuation of the mirrors (either static or dynamic (i.e., operation in resonant modes)) also allows for greater throughput. Throughput may also be improved by increasing the number of piezoelectrically actuated mirrors to allow for scaling to a greater number of beam lines. Since the piezoelectric mirrors are relatively small and do not require dedicated optics columns for each beam line, the increase in beam lines does not significantly increase the size or cost of the tool.

Embodiments of the invention that are utilized in projection display technologies also have significant advantages over the display technologies described above. For example, an array of piezoelectrically actuated mirrors may have a frequency of actuation sufficient to allow for an entire image to be scanned with a single row of mirrors. In some embodiments, the piezoelectrically actuated mirrors may be actuated in the X and Y directions to allow for even fewer rows of piezoelectrically actuated mirrors. In some embodiments even a single piezoelectrically actuated mirror may be used to project every pixel needed for an image. As such, projection display systems formed according to embodiments of the invention may be small enough to fit on headgear (e.g., glasses) in an unobtrusive manner.

Referring now to FIG. 1, a cross-sectional illustration of a scanning system 100 is shown, according to an embodiment of the invention. According to an embodiment, the scanning system 100 includes a light source 170, a piezoelectrically actuated mirror 130, and a workpiece 178. As illustrated, the light source 170 emits beam line 172 towards the piezoelectrically actuated mirror 130 and the piezoelectrically actuated mirror 130 reflects the beam line 172 towards the workpiece. The piezoelectrically actuated mirror is illustrated as a dashed box with a solid line representing a reflective surface when the mirror is unactuated, and two dashed lines to illustrate the maximum positive and negative deflections of the reflective surface. The dashed lines continue toward the workpiece 178 in order to illustrate the maximum positive and negative angles of deflection θ.

According to an embodiment, the angle of reflection from the piezoelectrically actuated mirror 130 to the workpiece 178 may be proportional to the voltage applied to the piezoelectric mirror 130. In an embodiment, the maximum angle of reflection θ may be limited by the plastic deformation of the piezoelectrically actuated mirror 130. Due to the structure and materials used to form the piezoelectrically actuated mirror 130 (described in greater detail below) the maximum angle of reflection may be up to approximately 30°. Such large reflection angles provide significant advantages to embodiments of the invention compared to previous solutions. For example, AODs are limited to deflecting at a maximum of approximately 5° from center, allowing for a much smaller maximum reflection angle. As such, the AODs require a relatively large distance between the AOD and the workpiece 178 in order to provide a suitable scan length across the workpiece. In contrast, the large reflection angles possible in embodiments of the present invention allow for a smaller separation between the piezoelectrically actuated mirror 130 and the workpiece, thereby reducing the required size of the tool. Alternatively, when a piezoelectrically actuated mirror 130 is positioned the same distance from the workpiece 178 as an AOD, the piezoelectrically actuated mirror will produce a much larger scan length, thereby increasing the throughput of the tool.

According to an embodiment, the piezoelectrically actuated mirror 130 may be displaced between a neutral position and the maximum deflection (in the positive or negative direction) in an analog (i.e., continuous) manner. The amount of deflection of the piezoelectrically actuated mirror 130 may be controlled by providing a voltage to the mirror. The piezoelectric material in the piezoelectrically actuated mirror responds by being strained in an amount proportional to the voltage applied. As such varying the voltage allows for the amount of deflection to be accurately controlled. It is to be appreciated that the piezoelectrically actuated mirror 130 illustrated in FIG. 1 is deflected about one axis, however, embodiments are not limited to such configurations. For example, the piezoelectrically actuated mirror 130 may be configured for dual axis deflection, as will be described in greater detail below.

In the illustrated embodiment, the scanning system 100 also includes additional optics components, though they are not necessary for operation of the system. For example, a light beam modulator 174 is located between the light source 170 and the piezoelectrically actuated mirror 130. A light source modulator 174 may be useful when the power of the light source is high enough that rapidly turning the light source on and off is impractical. Alternatively, when a low power light source 170 is used (e.g., a laser diode), the light source 170 may be able to be turned on and off sufficiently fast and a modulator is not needed. The combination of a modulator 174 or the use of a self-modulating light source 170 in conjunction with piezoelectrically actuatable mirrors 130 allows for painting a desired pattern or image onto the workpiece 178.

Additionally, the illustrated embodiment in FIG. 1 includes an optical lens 176 between the piezoelectrically actuated mirror 130 and the workpiece 178. According to an embodiment, the optical lens 176 may include one or more lenses for focusing the reflected light onto the workpiece 178. For example, the optical lens 176 may include any type of lens, such as an F-theta lens, or any combination of lenses. However, it is to be appreciated that a lens 176 is not required for all applications described herein.

Figure 2A:
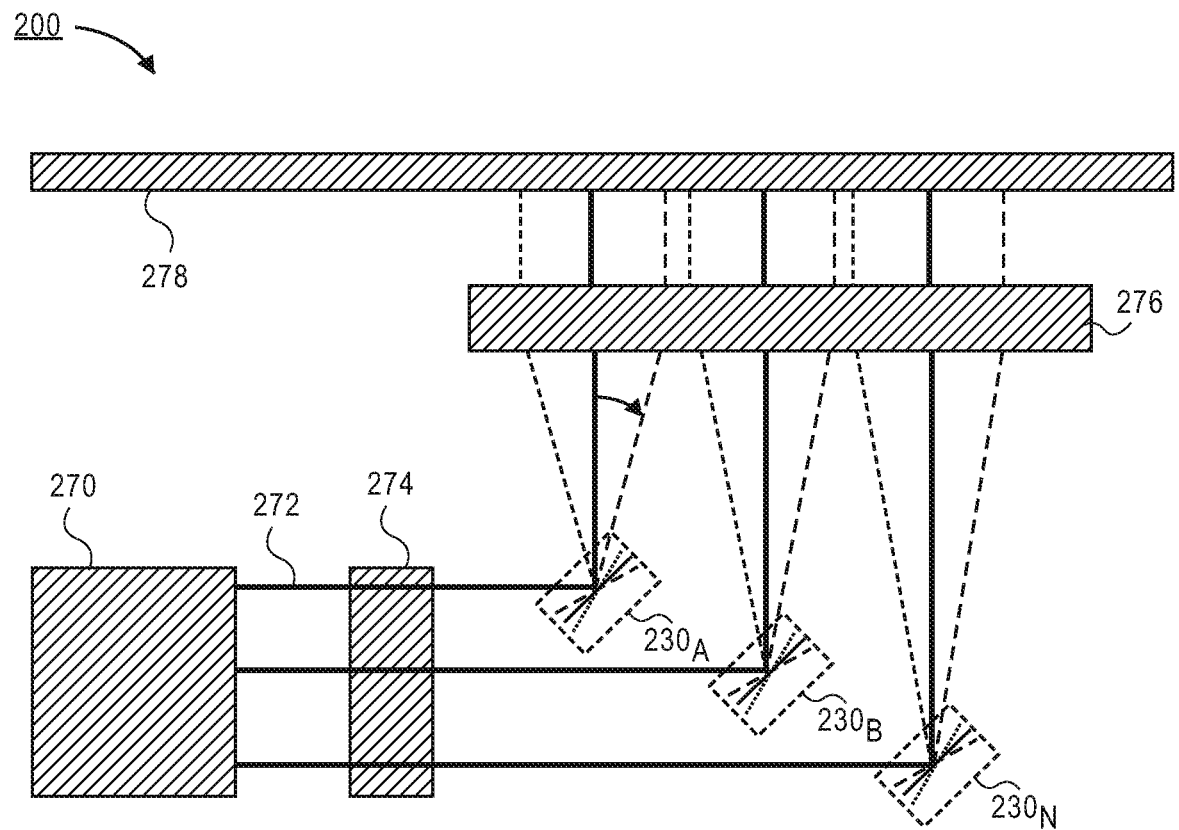
FIG. 2A is a side view illustration of a beam steering device for projecting a plurality of beam lines onto a substrate, according to an embodiment of the invention.
Figure 2B:
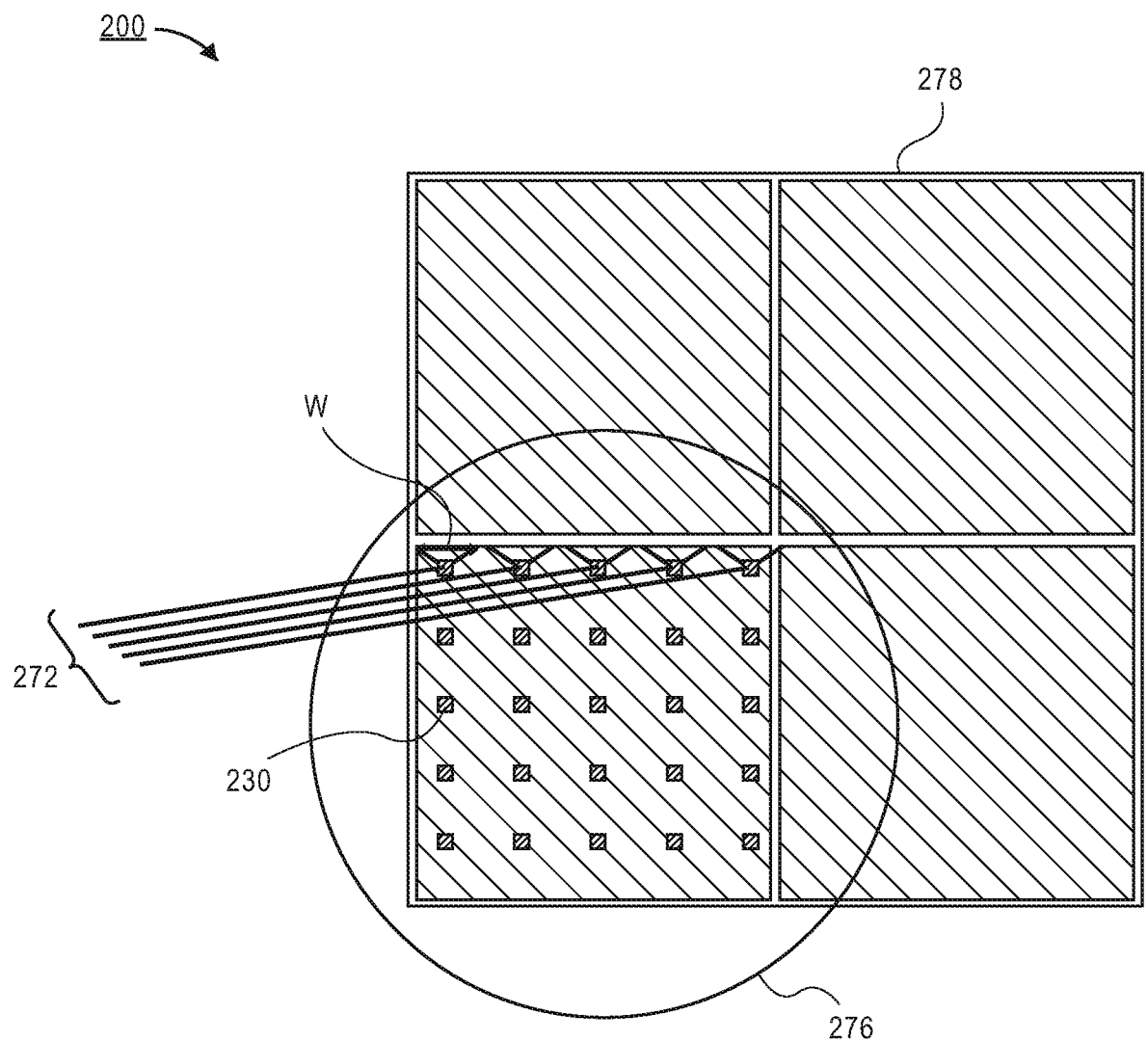
FIG. 2B is a plan view illustration of the beam steering device in FIG. 2A, according to an embodiment of the invention.

Referring now to FIGS. 2A and 2B, a more specific example of a scanning system that may be used in an LDIL tool 200 is described in greater detail. In FIG. 2A, a side view illustration of the LDIL tool 200 is shown, according to an embodiment of the invention. The basic structure of the LDIL tool 200 is substantially similar to the scanning tool illustrated in FIG. 1, with the exception that a plurality of beam lines 272 are used to increase the scanning area on the workpiece 278. According to an embodiment, each beam line 272 may be reflected off of a different piezoelectrically actuated mirror 230. For example, the LDIL tool 200 includes piezoelectrically actuated mirrors $230_A$-$230_N$. It is to be appreciated that any number of piezoelectrically actuated mirrors 230 may be used to provide the desired throughput for the tool.

In FIG. 2A, each of the beam lines 272 are emitted from a single light source 270, though it is to be appreciated that the light source 270 may include separate light sources for each beam line 270. Additionally, a single beam line may optionally be included that overfills each of the piezoelectrically actuated mirrors 230. However, such an embodiment may result in a decrease in the resolution of the LDIL tool 200. According to an embodiment, the light source 270 (or light sources) may be any suitable light source for emitting an electromagnetic beam (e.g., an optical-beam, a light beam, laser beam, or incoherent (but collimated) light beam).

According to an embodiment, the beam lines 272 may pass through a modulator 274, if needed. In the illustrated embodiment, a single modulator 274 is illustrated. However, it is to be appreciated that each beam line 272 may pass through different modulators 274 in some embodiments.

Additionally, in some embodiments, the beam lines 272 may pass through a lens 276 or lenses after being reflected by the piezoelectrically actuated mirrors 230. Unlike the LDIL solutions described above, it is to be appreciated that each of the beam lines 272 may pass through a single lens 276. As such, individual optics columns for each beam line are not necessary, thereby reducing the cost and complexity of the LDIL tool 200. Furthermore, the use of a single optics column allows for increased scalability by being able to inexpensively add additional piezoelectrically actuated mirrors 230.

Referring now to FIG. 2B, a top view illustration of the LDIL tool 200 is shown according to an embodiment of the invention. Due to the ability to scale the LDIL tool 200 by including more piezoelectrically actuated mirrors 230, the LDIL tool 200 may be able to rapidly process an entire quarter panel of a workpiece 278 (e.g., an area of 250×250 $mm^2$). Additional embodiments of the invention may also scale to pattern the entire panel, though a larger lens 276 may be needed, which would increase the cost of the tool 200. In the illustrated embodiment, only several beam lines 272 are illustrated in order to not obscure the Figure, but it is to be appreciated that each mirror 230 may be reflecting a beam line 272, as described above.

As illustrated, each beam line 272 may be scanned across a portion of the workpiece 278 a scan distance W. Due to the high reflection angles, the scan distance W of each piezoelectrically actuated mirror 230 may be larger than the scan distance available in prior LDIL tools. As such, fewer LDIL mirrors are needed, or the mirrors 230 may be placed closer to the workpiece to allow for the same throughput.

According to an embodiment, the LDIL tool 200 may include a moveable base (not shown) for moving the workpiece 278 in the Y direction and/or the piezoelectrically actuated mirrors 230 may be actuatable about two axes to allow for scanning in the X and Y directions. In an embodiment, the piezoelectrically actuated mirrors 230 may be operated in a resonant mode in order to continuously scan back and forth in order to increase throughput even further.

Figure 3:
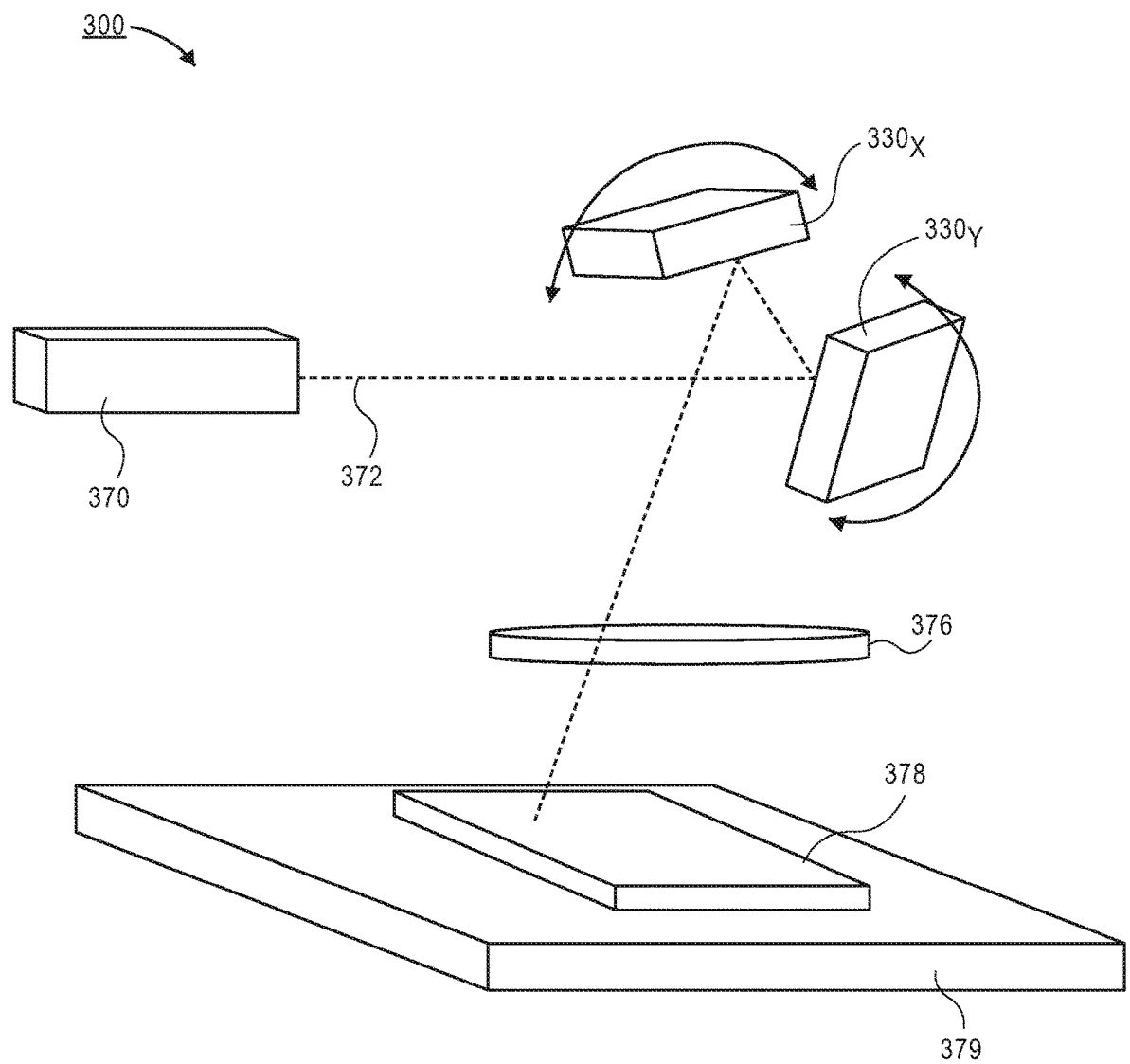
FIG. 3 is a perspective view of a beam steering device used for laser-drilling, according to an embodiment of the invention.

Referring now to FIG. 3, a perspective view of a via drill tool 300 is shown according to an embodiment of the invention. As illustrated, the via drill tool 300 may be operated with two piezoelectrically actuated mirrors 330. For example, a first piezoelectrically actuated mirror 330$_Y$ may provide actuation in the Y direction, and a second piezoelectrically actuated mirror 330$_X$ may provide actuation in the X direction (as indicated by the arrows). As illustrated, a beam line 372 from the light source 370 may be reflected by the first actuated mirror 330$_Y$. The first piezoelectrically actuated mirror 330$_Y$ may reflect the beam line 372 up and down the length of a second piezoelectrically actuated mirror 330$_X$, which then reflects the light to the workpiece 378 that is supported by a substrate holder 379. In an embodiment of the invention, the piezoelectrically actuated mirrors 330 may be operated in a static or stepwise mode (i.e., point-to-point deflection). Accordingly, the via drill tool 300 allows for a beam line to be directed in the X and Y directions across the workpiece 378. However, embodiments of the invention are not limited to two mirrors. For example, in some embodiments, a single piezoelectrically actuated mirror 330 may be actuatable about the X and Y directions.

The use of two or one piezoelectrically actuated mirrors 330 allows for significant compaction of the via drill tool compared to designs that include galvos, as described above. Additionally, the increased angle of deflection of the mirrors allows for increased throughput compared to the via drill tools that utilize AODs. Furthermore, since the piezoelectric mirrors 330 are small and inexpensively produced, embodiments of the invention may scale the tool 300 to provide additional beam lines 372 to further increase throughput or increase the versatility of the via drill tool 300. According to an embodiment, increasing the number of beam lines 372 may only require an increase in the number of piezoelectrically actuated mirrors (and the number of light sources) since additional optical columns are not needed to provide a different lens 376 for each beam line 372.

According to an additional embodiment of the invention, the piezoelectrically actuated mirrors may also be used in a projector system. Exemplary embodiments of such projector systems are described with respect to FIGS. 4A-6.

Figure 4A:
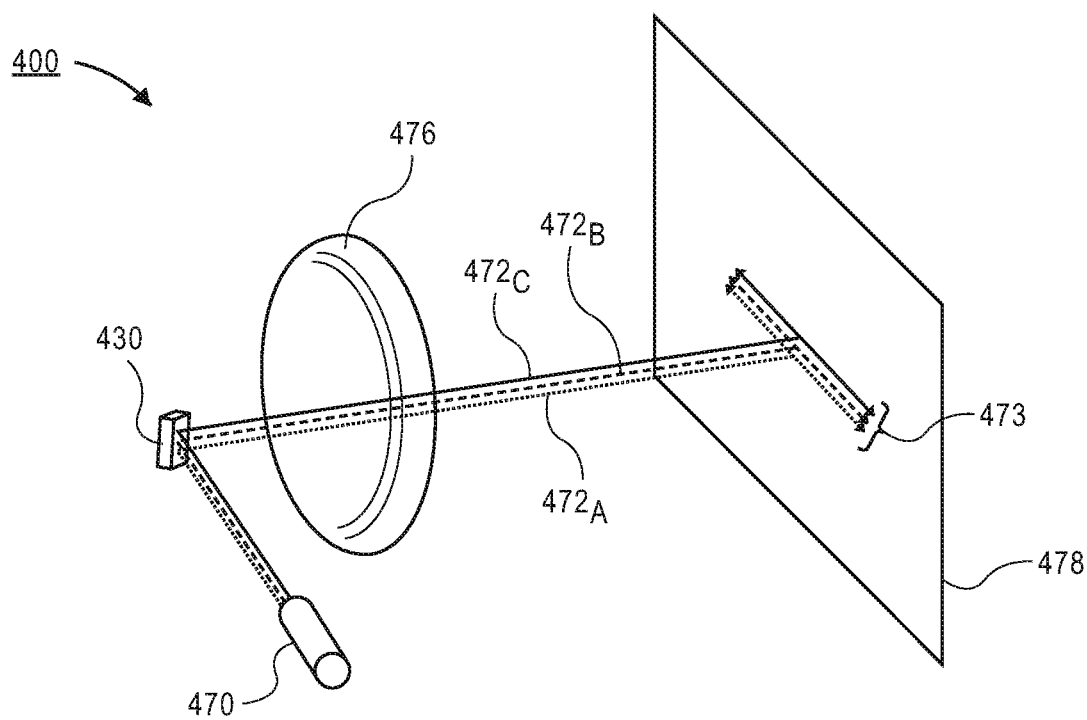
FIG. 4A is a perspective view of a beam steering device used for projecting an image onto a screen, according to an embodiment of the invention.
Figure 4B:
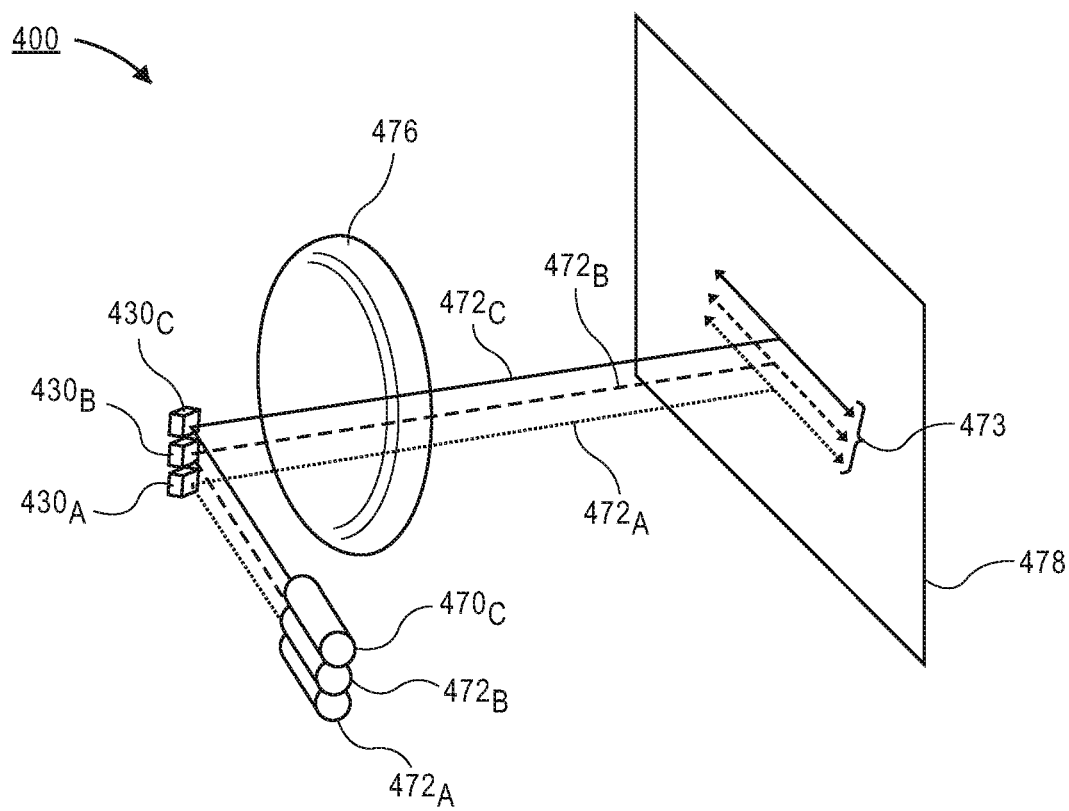
FIG. 4B is a perspective view of a beam steering device with a plurality of light sources for projecting an image onto a screen, according to an embodiment of the invention.
Figure 4C:
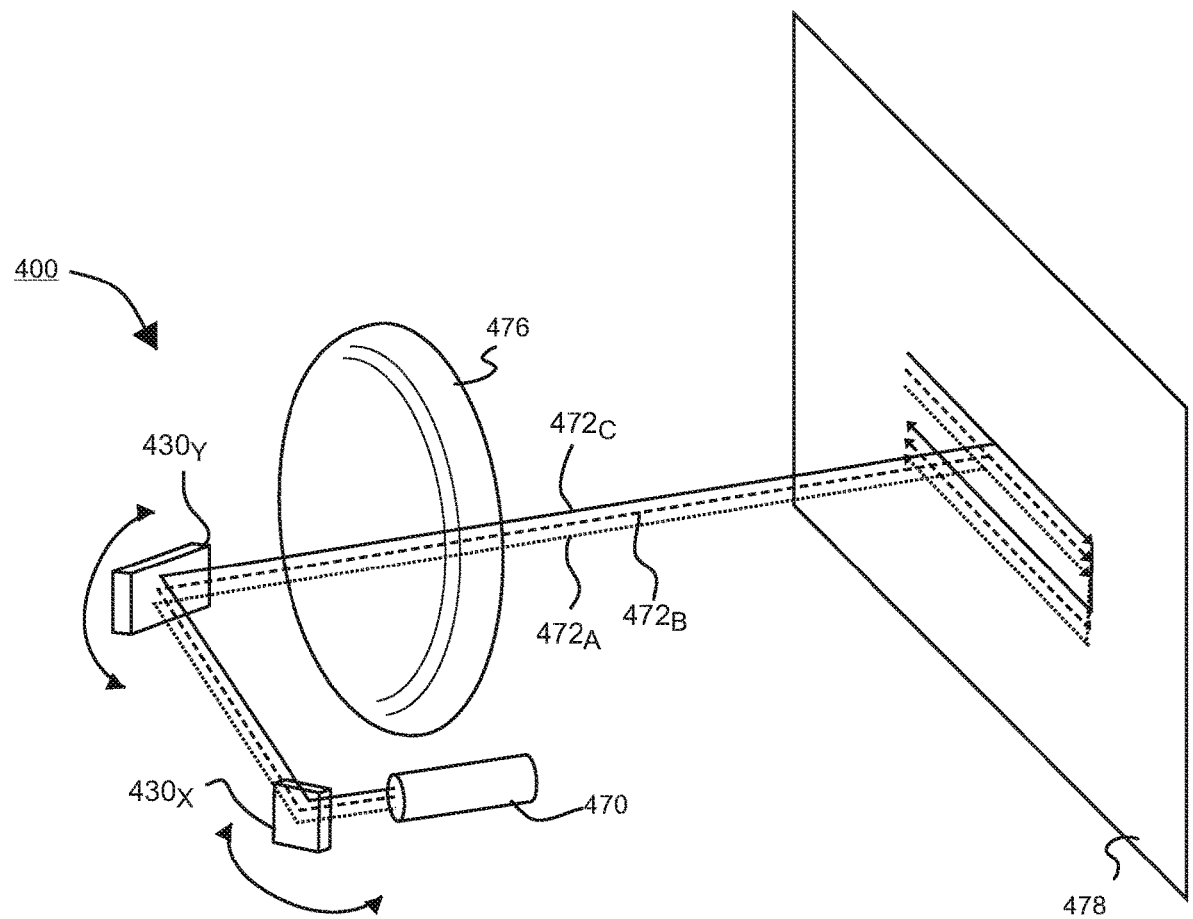
FIG. 4C is a perspective view of a beam steering device for projecting an image onto a screen with two mirrors, according to an additional embodiment of the invention.

Referring now to FIGS. 4A-4C, perspective views of projector systems 400 are shown according to embodiments of the invention. In the Figures, a single row of the projected display is shown. For example, in FIG. 4A a single piezoelectric mirror 430 is shown that is able to accommodate three different colors of light (472$_A$, 472$_B$ and 472$_C$) and in FIG. 4B a group of three piezoelectrically actuated mirrors are shown to accommodate the three different colors of light (472$_A$, 472$_B$ and 472$_C$). However, it is to be appreciated that the number of piezoelectrically actuated mirrors 430 may correspond to the number of rows for the resolution of the projector (e.g., in a display with 1080p resolution, there may be 1080 rows when each mirror accommodates three colors or there may be 3240 mirrors when each mirror accommodates a single color). When the scan speed is high enough, it may be possible to have a single piezoelectrically actuated mirror 430 raster several rows or even the entire display when the piezoelectrically actuated mirrors 430 are able to deflect in the X and Y directions. Accordingly, the number of piezoelectrically actuated mirrors 430 and the complexity of the device may be reduced.

According to an additional embodiment, illustrated in FIG. 4C, two piezoelectrically actuated mirrors 430 may be used for each beam line 472 in a manner substantially similar to the via-drill embodiment described above with respect to FIG. 3. In such an embodiment, a first mirror 430$_X$ scans along the X-axis and a second mirror 430$_Y$ scans along the Y-axis. As in the case of LDIL the projection systems 400 may utilizes continuous (i.e., dynamical, oscillating/resonating) mirror motion in order to paint an image onto the screen 478.

In the embodiments illustrated in FIG. 4A-4C, each of the beam lines (472$_A$, 472$_B$ and 472$_C$) passes through a lens 476 and are projected onto a screen 478 in a raster pattern 473. However, embodiments are not limited to such configurations. For example, the lens 476 may be omitted, or more than one lens 476 may be used. Additionally, the raster pattern 473 may be projected onto any surface. For example, the raster pattern 473 may be projected onto glass (e.g., for use as a heads up display in auto or aviation windshields or on a visor of a helmet). Additionally, the raster pattern 473 may be projected directly into the eye of a viewer. Examples of such an embodiment are described with respect to FIGS. 5 and 6.

Embodiments of the invention may be particularly beneficial for use in projection systems that project directly into the eye because the scanning of the one or several piezoelectrically actuated mirrors allows for a full picture (e.g., three mirrors, one for each color, to raster across the retina to form a picture or a single mirror for all three colors). In such embodiments, the low light intensity required for direct retina exposure (to prevent damage to the retina), allows for the light to be modulated directly at the light sources (e.g., light emitting diodes (LEDs) or laser diodes (LDs)), thereby eliminating the need for a modulation component. The small weight and fast oscillating/rastering capability of the piezoelectrically actuated mirrors leads to a simple and robust display system.

Furthermore, since embodiments may only need three light sources and three uniform size or one elongated mirror to form the full picture, display systems may be energy efficient, which is a key requirement for wearable devices because they need to be more compact and lower weight than any other system. For example, piezoelectrically actuated mirrors formed according to embodiments of the invention may allow for between approximately 10 kHz-30 kHz oscillations with displacements of ±3 to ±6 degrees. At a distance of at least 50 mm from the retina, these displacements and oscillation frequencies are sufficient for providing a full image. For example, approximately 15 kHz is sufficient to create 30 frames/second at 1080 rows resolution. When operated at this frequency in resonant mode (i.e., continuous scan mode) a single piezoelectric mirror may dissipate less than 1 mW power. That, combined with a laser power of less than 1 mW combined for three colors (to be below the retinal damage threshold), may yield a power consumption of less than approximately 2 mW for full color high definition display projected directly to the retina.

Figure 5:
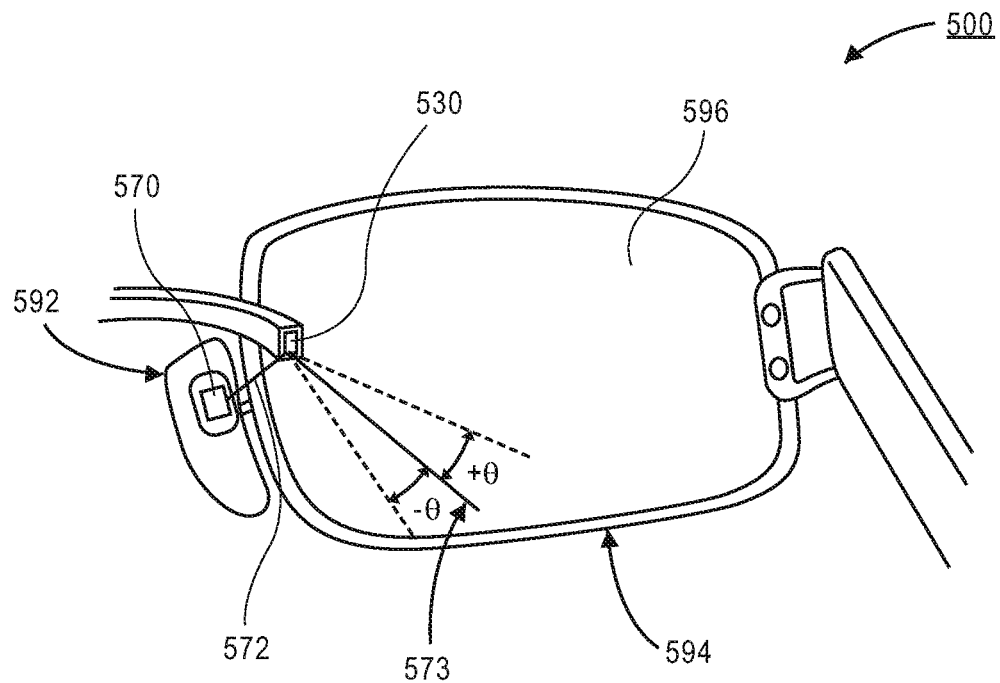
FIG. 5 is a perspective view of a portion of glasses that include a beam steering device for projecting an image onto an eye, according to an embodiment of the invention.

Referring now to FIG. 5, a perspective view of a portion of a pair of glasses 500 that includes a projection system is shown, according to an embodiment of the invention. According to an embodiment, the glasses 500 may be any frame style that is able to accommodate the components of the display system. For example, the glasses 500 may include a frame 594 and lenses 596. The lenses 596 may be prescription lenses, sunglass lenses, or any other lens. In an embodiment, the light source 570 may be integrated into a nose piece 592. In the illustrated embodiment, a cutout is shown in the nose piece to illustrate that the light source 570 may be formed within the nose piece. According to an embodiment, the light source 570 may emit a beam line 572 through a passage in the interior of the nosepiece 592 and out the nosepiece 592 towards a piezoelectrically actuated mirror 530 (or mirrors 530) that are mounted on a cross-piece of the frame 594. While the piezoelectrically actuated mirror 530 is shown being on a cross-piece of the frame 594 and the light source 570 is shown being in the nose piece, it is to be appreciated that these components may be mounted anywhere on the glasses 500 that allows for a rastered beam line 573 to be projected to an eye. Additionally, while a single light source 570 and mirror 530 are shown, embodiments may include multiple light sources and piezoelectrically actuated mirrors 530, similar to the devices described above.

Figure 6:
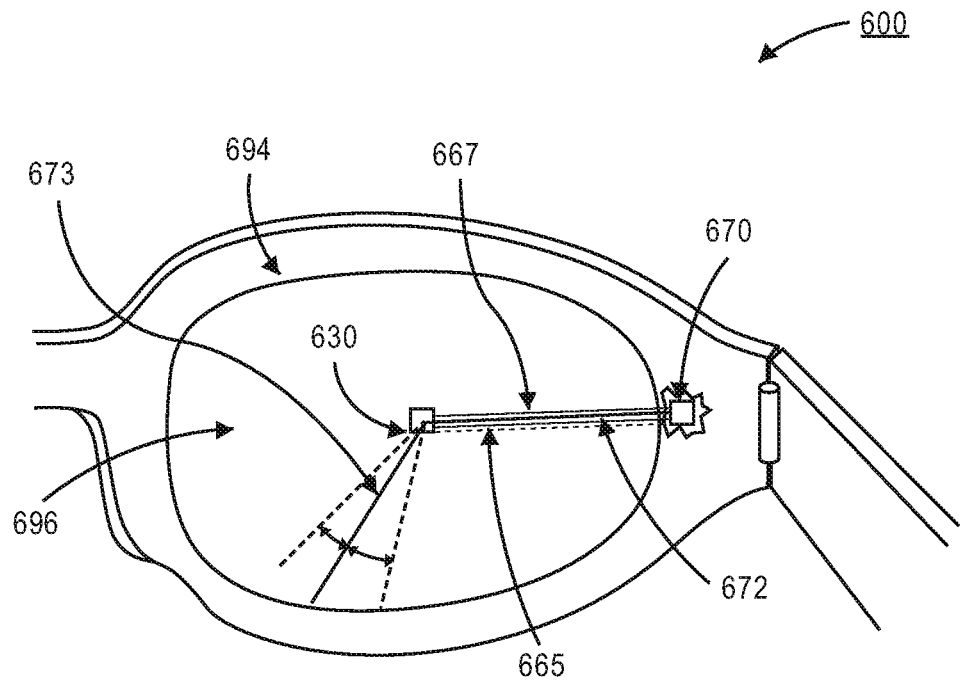
FIG. 6 is a perspective view of a portion of glasses that include a beam steering device for projecting an image onto an eye, according to an additional embodiment of the invention.

Referring now to FIG. 6, a portion of a pair of glasses are shown according to an additional embodiment of the invention. In FIG. 6, the light source 670 is located within the frame 694 of the glasses 600. According to an embodiment, the beam line 672 may be emitted along a transparent waveguide 667 that is conformal with the lens 696 of the glasses 600. The waveguide 667 may guide the beam line 672 to a piezoelectrically actuated mirror 630 (or mirrors) that are located on the lens 696. Due to the small size of the piezoelectrically actuated mirrors 630, the small footprint may not significantly disrupt normal viewing through the glasses 600. In order to provide power to the piezoelectrically actuated mirror 630, a conductive trace 665 formed with a transparent conductive material (e.g., indium tin oxide) may be formed over or in the lens to connect a power source in the frame 694 to the piezoelectrically actuated mirror 630.

In addition to embodiments described in detail herein, additional applications that utilize piezoelectrically driven mirrors and optics systems similar to those described above may be used for laser guidance and scanning for various military and civilian applications. Furthermore, while projection display systems are described for use in wearable devices, embodiments are not limited to such configurations. For example, larger area displays may also be formed in accordance with embodiments of the invention.

Embodiments of the invention described above rely on piezoelectrically actuated mirrors that are steerable mirrors and that are integrated into a substrate. The structure of the piezoelectrically actuated mirrors, the actuation mechanism, and processes for forming such mirrors are described in greater detail below with respect to FIGS. 7A-9E.

Figure 7A:
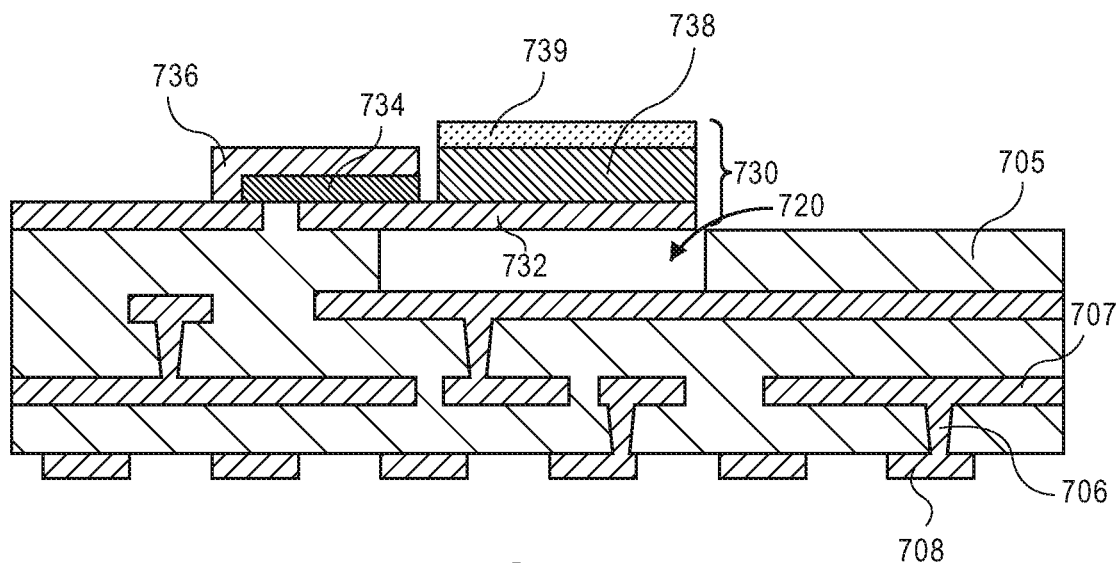
FIG. 7A is a cross-sectional illustration of a piezoelectric mirror formed on an organic substrate, according to an embodiment of the invention.

Referring now to FIG. 7A, a cross-sectional illustration of an organic substrate 705 that includes a piezoelectrically actuated mirror 730 is shown, according to an embodiment of the invention. In an embodiment, the organic substrate 705 may be any suitable organic material. By way of example, the organic substrate 705 may be a polymer material, such as, for example, polyimide, epoxy, or build-up film. The organic substrate 705 may include one or more layers (i.e., build-up layers). According to an embodiment, the organic substrate 705 may also include one or more conductive traces 707, vias 706, and pads 708 to provide electrical routing in the organic substrate 705. The conductive traces 707, vias 706, and pads 708 may be any suitable conductive material typically used in organic packaging applications (e.g., copper, tin, aluminum, alloys of conductive materials, and may also include multiple layers, such as seed layers, barrier layers, or the like).

According to an embodiment, the piezoelectrically actuated mirror 730 may be anchored to the organic substrate 705 and oriented so that it extends over a cavity 720 formed in the organic substrate 705. The cavity 720 may be sized so that it is larger than the mirror 730 in order to allow the mirror 730 to be displaced into the cavity 720. According to an embodiment, the depth of the cavity 720 may be chosen to allow for the desired amount of displacement of the piezoelectrically actuated mirror 730 into the cavity 720. For example, increasing the depth allows for greater displacement of the piezoelectrically actuated mirror 730.

According to an embodiment, the piezoelectrically actuated mirror 730 includes a piezoelectric layer 734 formed between a first electrode 732 and a second electrode 736. High performance piezoelectric materials suitable for actuating mirrors according to embodiments described herein, typically require a high temperature anneal (e.g., greater than 500° C.) in order to provide the proper crystal structure to attain the piezoelectric effect. As such, previous devices that utilize high performance piezoelectric materials typically require a substrate that is capable of withstanding high temperatures (e.g., silicon). Organic substrates, such as those described herein, typically cannot withstand temperatures above 260° C. However, embodiments of the present invention allow for a high performance piezoelectric layer 734 to be formed at much lower temperatures. For example, instead of a high temperature anneal, embodiments include depositing the piezoelectric layer 734 in an amorphous phase and then using a pulsed laser to crystalize the piezoelectric layer 734. In an embodiment, the pulsed laser annealing process may include the use of an excimer laser with an energy density in the range of 10-100 mJ/cm$^2$ and a pulse width in the range 10-50 ns. In an embodiment, the piezoelectric layer 734 may be deposited with a sputtering process, an ink jetting process, or the like. According to an embodiment, the piezoelectric layer may be lead zirconate titanate (PZT), potassium sodium niobate (KNN), zinc oxide (ZnO), or combinations thereof.

Manufacturing piezoelectrically actuated mirrors on organic substrates allows for a decrease in the manufacturing cost. For example technologies and materials developed for package/board processing are significantly less expensive than technologies and materials used for semiconductor processing. Fabricating steerable mirrors directly in the substrate or board reduces the cost over silicon MEMS because of the large panel size (e.g., 510 mm×515 mm) used for organic substrate and board fabrication, and the less expensive materials used in those systems compared to silicon MEMS.

The first electrode 732 and the second electrode 736 may be electrically coupled to a voltage source by conductive traces 707 in the microelectronic package. For example, the voltage source may be a routing die (not shown) similar to the routing die described above. As such, a voltage applied across the first electrode 732 and the second electrode 736 may be generated. The voltage applied across the first electrode 732 and the second electrode 736 induces a strain in the piezoelectric layer 734 that causes displacement of the mirror 730. In an embodiment, the displacement of the piezoelectrically actuated mirror 730 is proportional to the voltage across the first electrode 732 and the second electrode 736, as will be described in greater detail below. In FIG. 7A, the piezoelectric layer 734 and the second electrode 736 extend only partially across the top surface of the first electrode 732, though embodiments are not limited to such configurations. For example, the piezoelectric layer 734 and the second electrode 736 may extend completely across the top surface of the first electrode 732.

According to an embodiment, the first electrode 732 and the second electrode 736 are formed with a conductive material. In some embodiments, the first electrode 732 and the second electrode 736 may be formed with the same conductive material used to form the conductive traces 707, vias 706, and pads 708 formed in the organic substrate 705. Such an embodiment allows for the manufacturing of the display to be simplified since additional materials are not needed, though embodiments are not limited to such configurations. For example, the electrodes 732, 736 may be different materials than the traces 706. Additional embodiments may include a first electrode 732 that is a different material than the second electrode 736. The conductive material used for the first electrode 732 and the second electrode 736 may be any conductive material (e.g., copper, aluminum, alloys, etc.).

According to an embodiment, a reflective surface 738 may be formed on the piezoelectrically actuated mirror 730. In the illustrated embodiment, the reflective surface 738 may substantially cover the exposed portion of the first electrode 732. As such, displacing the mirror 730 allows for the reflective surface 738 to be displaced as well. The reflective surface 738 may be sized to capture light that is emitted from a light source Minimizing the size of the reflective surface 738 and the piezoelectrically actuated mirror 730 may allow for more mirrors to be formed in a given area or allow for the mirror to be driven with less power. For example, the reflective surface 738 may have a surface area between approximately 50 µm-100 µm by 200 µm-500 µm, though reflective surfaces 738 that have smaller or larger surface areas may also be formed according to embodiments of the invention.

According to an embodiment, the reflective surface 738 may have a surface roughness that is less than approximately 700 nm. Additional embodiments may include reflective surfaces 738 that have a surface roughness that is less than approximately 100 nm. Yet another embodiment may have a surface roughness that is less than approximately 10 nm. The surface roughness may be dictated by the deposition techniques used to form the reflective surface 738. Additionally, surface treatments may be used to further reduce the surface roughness of the reflective surface 738. According to an embodiment, the reflective surface 738 may be any reflective material. For example, the reflective surface 738 may be aluminum, silver, gold, tin, alloys of reflective materials, or the like. According to an embodiment, a protective coating 739 may be formed over the reflective surface 738 to prevent oxidation or other damage. For example, the protective coating may be any optically clear material.

While a distinct material layer is illustrated in FIG. 7A as being the reflective surface 738, embodiments may also include using a top surface of an electrode 732, 736 as the reflective surface 738. For example, in typical microelectronic packaging operations, copper may be deposited with a surface roughness of approximately 100 nm, and the surface roughness is then increased with a surface roughening operation in order to increase the adhesion between layers. In an embodiment, the surface roughing operation may be omitted and the copper with a surface roughness of approximately 100 nm may be used as the reflective surface 738.

Figure 7B:
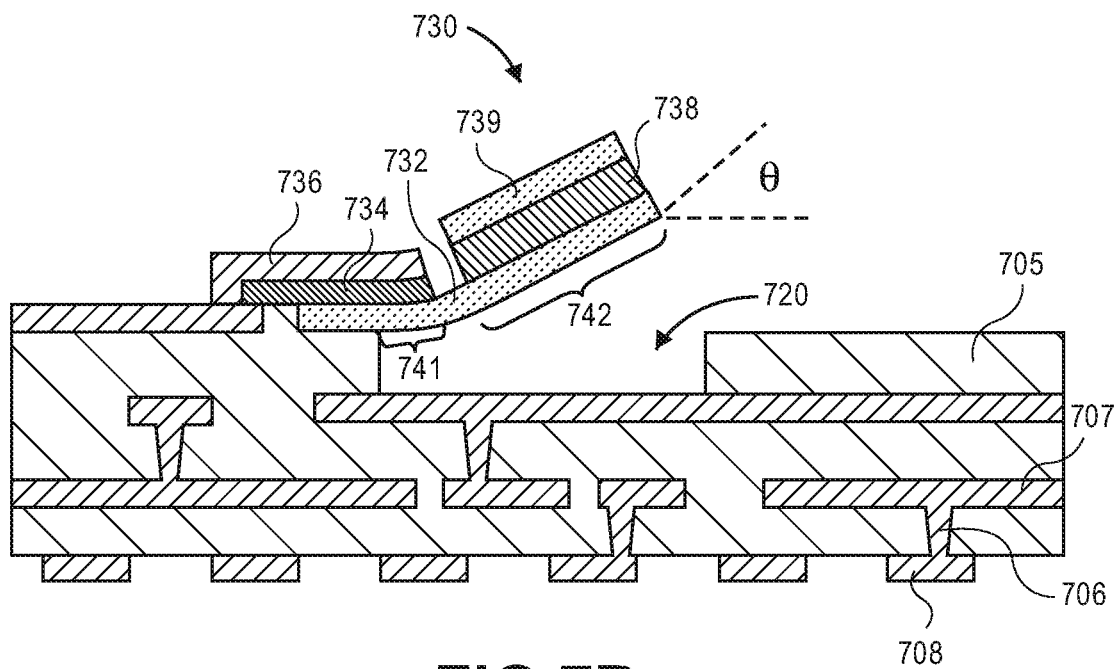
FIG. 7B is a cross-sectional illustration of the piezoelectric mirror in FIG. 7A being actuated, according to an embodiment of the invention.

Referring now to FIG. 7B, a cross-sectional illustration of an organic substrate 705 with a piezoelectrically actuated mirror 730 in an actuated state is shown, according to an embodiment of the invention. The piezoelectrically actuated mirror 730 may be displaced by applying a voltage across the first electrode 732 and the second electrode 736. The voltage produces strain in the piezoelectric layer 734 that causes the piezoelectrically actuated mirror 730 to displace towards or away from the substrate 705, depending on the bias of the voltage.

As illustrated in FIG. 7B, the piezoelectrically actuated mirror 730 is deflected away from substrate 705 at an angle θ. The deflection angle θ may be proportional to the voltage across the first electrode 732 and the second electrode 736. In an embodiment, the deflection angle θ is limited by the plastic deformation of the first and second electrodes 732, 736 (i.e., the angle θ may be up to the point where the deformation regime of the electrodes changes from elastic deformation to plastic deformation). For example, the deflection angle θ may be approximately 30° or less when copper is used for the first and second electrodes 732, 736. However, it is to be appreciated that deflection angles of approximately 10° or less may be obtained by applying voltages between approximately 10-20 volts, depending on the geometry of the piezoelectrically actuated mirror 730. As illustrated, the piezoelectrically actuated mirror 730 includes a non-linear (e.g., curved) portion 741 where the piezoelectric layer 734 is formed and a linear portion 742 where there is no piezoelectric layer 734. Accordingly, the reflective surface 738 may be formed on a surface that does not curve when the actuator deflects. According to an embodiment, the piezoelectrically actuated mirror 730 may be deflected in an analog manner to any deflection angle less than the maximum deflection angle θ. Accordingly, embodiments of the invention may allow for incoming beam lines to be reflected to more than one location.

According to an additional embodiment of the invention, the mirror formed on the actuator may also be a discrete component that is bonded to the actuator instead of being deposited onto the actuator. In one embodiment, the reflective surface may be a die that is mounted to the piezoelectrically actuated mirror with a bonding layer. For example, the bonding layer may be an epoxy, a solder, or the like. Forming the reflective surface as a discrete die may allow for a plurality of reflective surfaces to be fabricated on a substrate other than the organic substrate 305, and then the die may be mounted to a piezoelectrically actuated mirror with a pick and place tool, or any other mounting technique. Forming the reflective surface as a discrete component may also allow for more complex mirrors to be used without significantly decreasing the throughput. For example, forming the mirror as a discrete component may allow for more complex mirror shapes such as concave or convex mirrors, or for different filters or polarizers to be used. In addition to using a die for the reflective surface, embodiments may also include a reflective surface that is a thin sheet of reflective material (e.g., aluminum, silver, gold, tin, alloys of reflective materials, etc.).

Referring now to FIGS. 8A-8D, a series of plan view illustrations of piezoelectrically actuated mirrors 830 are shown, according to various embodiments of the invention. In order to not unnecessarily obscure the Figures, the reflective surface is omitted. However, it is to be appreciated that the reflective surface may be mounted or formed on the piezoelectrically actuated mirrors 830 similar to the devices described above. Additionally, vias or other conductive features used to electrically couple the piezoelectrically actuated mirrors 830 to a power source used to drive the actuation is omitted in order to not unnecessarily obscure the Figures.

Figure 8A:
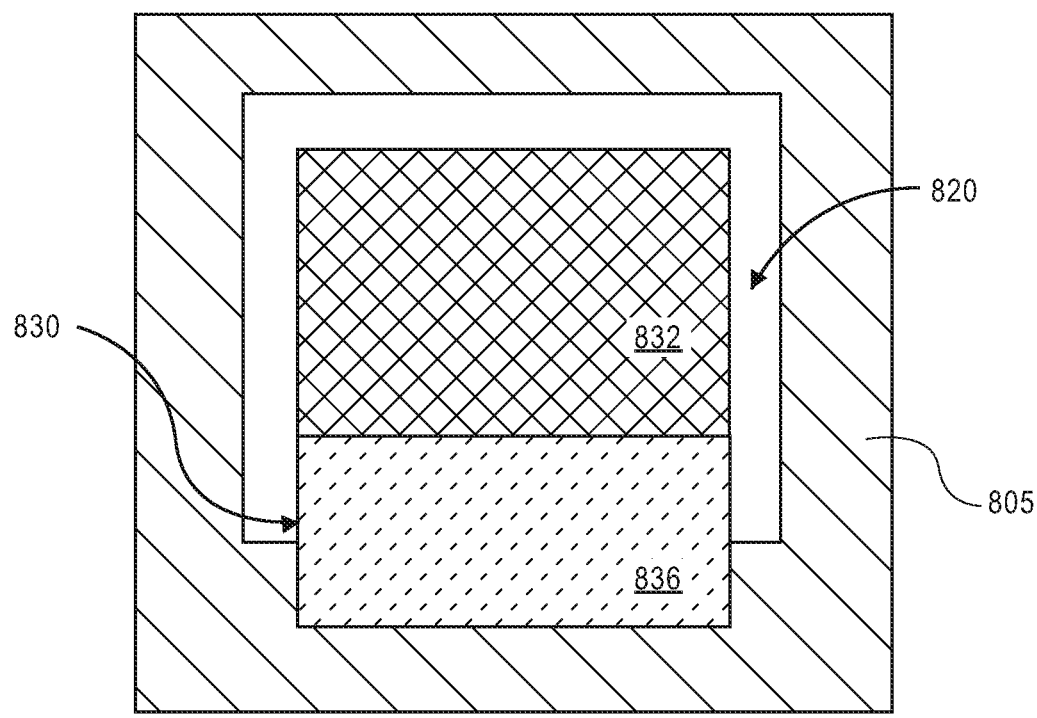
FIG. 8A is a plan view of a piezoelectrically actuated mirror that extends over a cavity and is anchored to an organic substrate along one edge of the cavity, according to an embodiment of the invention.

Referring now to FIG. 8A, the second electrode 836 extends out from the organic substrate 805 over the cavity 820. According to an embodiment, the width of the first and second electrodes 832, 836 may be substantially equal to each other or the second electrode 836 may be a different width than the first electrode. As such, the second electrode 836 and the piezoelectric layer (not visible in FIG. 8A) may extend substantially along an entire edge of the first electrode 832. Accordingly, the piezoelectrically actuated mirror 832 forms a cantilever beam that can be deflected into the cavity 820 or away from the organic substrate 805. Such an embodiment may allow for deflection about a single axis and, therefore, may be suitable for use in one-dimensional reflecting applications.

Figure 8B:
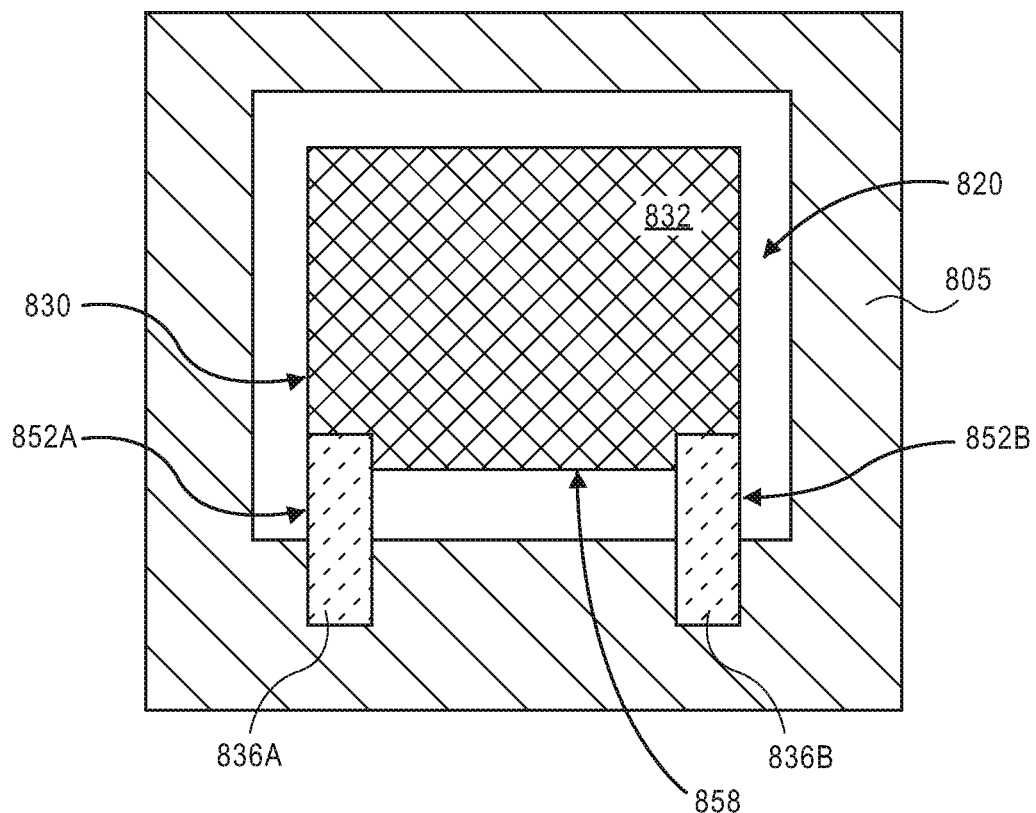
FIG. 8B is a plan view of a piezoelectrically actuated mirror that includes two actuation arms anchored to an organic substrate, according to an embodiment of the invention.

Referring now to FIG. 8B, a plan view illustration of a piezoelectrically actuated mirror 830 that is anchored to the organic substrate 805 with two actuation arms 852 is shown, according to an embodiment of the invention. As illustrated in FIG. 8B, actuation arms 852A and 852B are formed on opposite ends of an edge 858 of the first electrode 832. In an embodiment, the actuation arms 852 may be beams that extend out from the organic substrate 805 over the cavity 820. Each actuation arm 852 may include a stack that includes a portion of the piezoelectric layer (not visible) formed between a portion of the first electrode 832 and a portion of the second electrode 836. It is to be appreciated that a portion of the first electrode 832 also attaches to the organic substrate 805. Accordingly, the first electrode 832 may be a single continuous layer that has beam like portions that extend out from the organic substrate 805 and attach to a pad portion on which the reflective layer (not shown) may be placed or formed. In contrast, the second electrode 836 may be a discontinuous layer. For example, the first actuation arm 852A may include a first portion of the second electrode 836A and the second actuation arm 852B may include a second portion of the second electrode 836B. In an embodiment, the first portion 836A may be electrically isolated from the second portion 836B in order to allow for each actuation arm 852 to be controlled independently. Alternative embodiments may have the first portion 836A and the second portion 836B electrically coupled to each other and held at the same voltage.

In the piezoelectrically actuated mirrors illustrated in FIGS. 8A-8B, the second electrode 836 and the piezoelectric layer (not visible in FIGS. 8A-8B) do not extend completely across the top surface of the first electrode 832. However, embodiments are not limited to such configurations. For example, the second electrode 836 and the piezoelectric layer may extend completely over a top surface of the first electrode 832. The increased length of the piezoelectric layer and the second electrode 836 may allow for a greater deflection angle to be obtained with the same voltages, compared to the embodiments where the piezoelectric layer and the second electrode do not extend across the entire length of the first electrode.

Figure 8C:
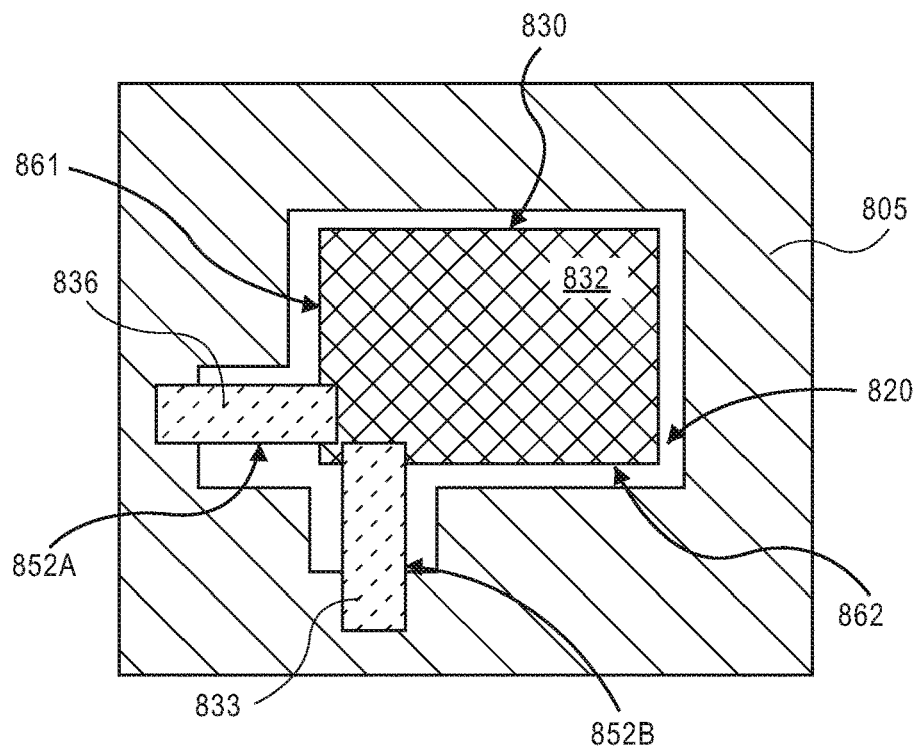
FIG. 8C is a plan view of a piezoelectrically actuated mirror with two actuation arms that are formed on different edges of the actuated structure, according to an embodiment of the invention.

According to an additional embodiment of the invention, the piezoelectrically actuated mirrors may be deflected in more than one direction to enable two-dimensional switching. One example of such an embodiment is illustrated in FIG. 8C. As illustrated, a piezoelectrically actuated mirror 830 may have a first actuation arm 852A formed along a first edge 861 of the first electrode 832 and a second actuation arm 852B formed along a second edge 862 of the first electrode 832. According to an embodiment, the first actuation arm 852A may include a second electrode 836 that is formed over a piezoelectric layer (not visible in FIG. 8C) and the second actuation arm 852B may include a third electrode 833 that is also formed over a piezoelectric layer (not visible in FIG. 8C). According to an embodiment, the second electrode 836 and the third electrode 833 may be electrically isolated from each other and able to operate independently from each other. Accordingly, the piezoelectrically actuated mirror 830 may be deflected about an axis substantially parallel to the first edge 861 and out of the plane of the display by the first actuation arm 852A and about an axis substantially parallel to the second edge 862 and out of the plane of the display by the second actuation arm 852B.

Figure 8D:
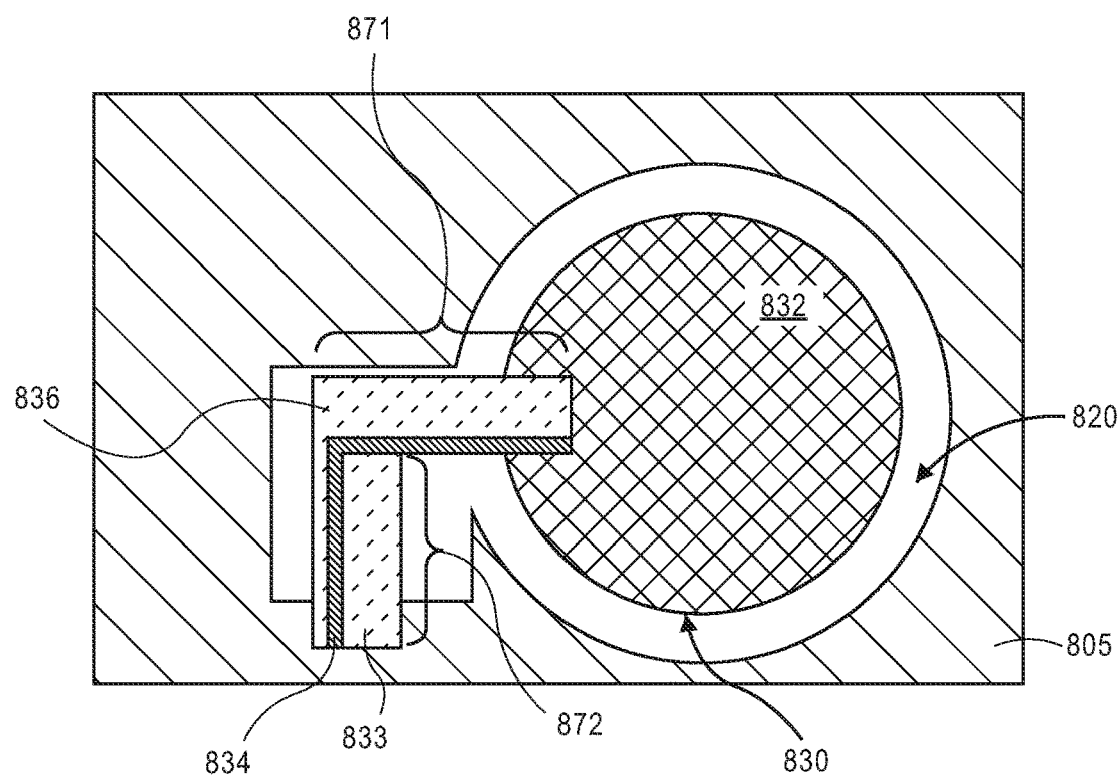
FIG. 8D is a plan view of a piezoelectrically actuated mirror that includes a single actuation arm that allows for deflection in multiple directions, according to an embodiment of the invention.

Referring now to FIG. 8D, a plan view illustration of an organic substrate 805 that includes an actuator 830 that may be deflected in more than one direction is shown according to an additional embodiment of the invention. Instead of requiring two actuation arms that are attached to different edges of the first electrode 832, embodiments of the invention may include an actuation arm that has a first length 871 and a second length 872. According to an embodiment, the second length 872 may be substantially orthogonal to the first length 871. In order to isolate actuation to the different lengths of the actuation arm, a second electrode 836 may be formed primarily along the first length 871, and a third electrode 833 may be formed along the second length 872. As shown in FIG. 8D, the spacing between the second electrode 836 and the third electrode 833 exposes a portion of the piezoelectric layer 834 that is formed below both the second and the third electrodes 836, 833.

In some embodiments, the second electrode 836 may also extend along the second length 872 in order to be electrically coupled to a contact on the organic substrate 805. However, it is to be appreciated that the surface area of the third electrode 833 over the piezoelectric layer 834 in the second length 872 is greater than the surface area of the second electrode 836. As such, the actuation provided by the second length is primarily controlled by applying a voltage across the third electrode 833 and the first electrode 832, and the actuation provided by the first length 871 is primarily controlled by applying a voltage across the second electrode 836 and the first electrode 832.

While the embodiments described in the previous Figures have included actuators with substantially rectangular shaped pads for supporting the reflective surface, it is to be appreciated that embodiments are not limited to such configurations. For example, FIG. 8D illustrates a piezoelectrically actuated mirror 830 that has a substantially circular pad for supporting a reflective surface. The use of a circular shaped pad may allow for the elimination of corner effects experienced with the rectangular shaped pads. Additionally, it is to be appreciated that embodiments of the invention may also include an actuator with a piezoelectric layer and a second electrode that cover the entire top surface of the first electrode, and which are substantially circular as well. Furthermore, embodiments may include a substantially circular shaped pad in combination with any of the actuation arm configurations described herein (e.g., single arm, multi-arm, multi-arm with multiple axis deflection, single-arm with multiple axis deflection, etc.)

Figure 9A:
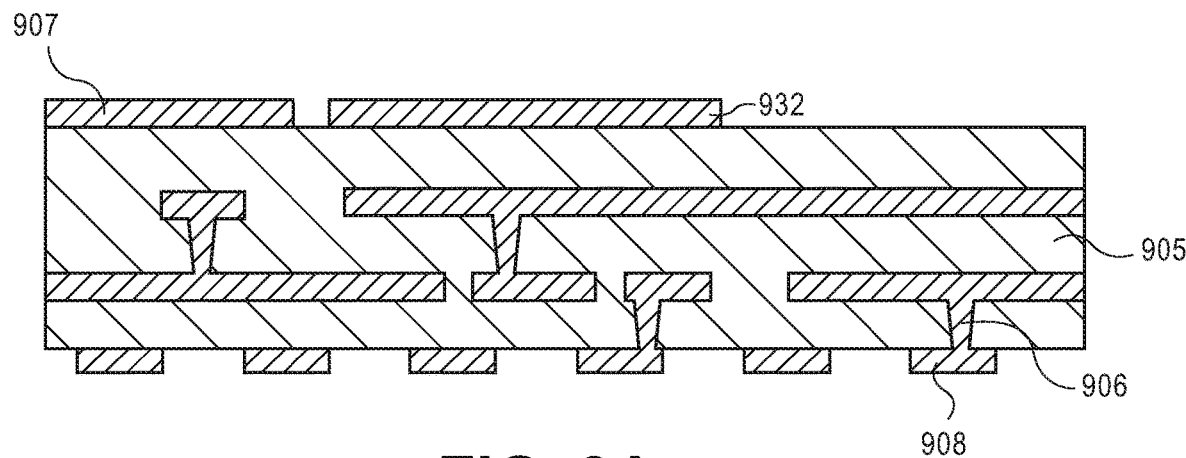
FIG. 9A is a cross-sectional illustration of an organic substrate after the first electrode has been formed, according to an embodiment of the invention.

Referring now to FIGS. 9A-9E, a process flow for forming an actuator in an organic substrate is shown according to an embodiment of the invention. Referring now to FIG. 9A, the first electrode 932 is formed over a top surface of an organic substrate 905. According to an embodiment, the first electrode 932 may be formed with manufacturing processes known in the semiconductor and substrate manufacturing industries, such as semi-additive processing, subtractive processing, or the like.

Figure 9B:
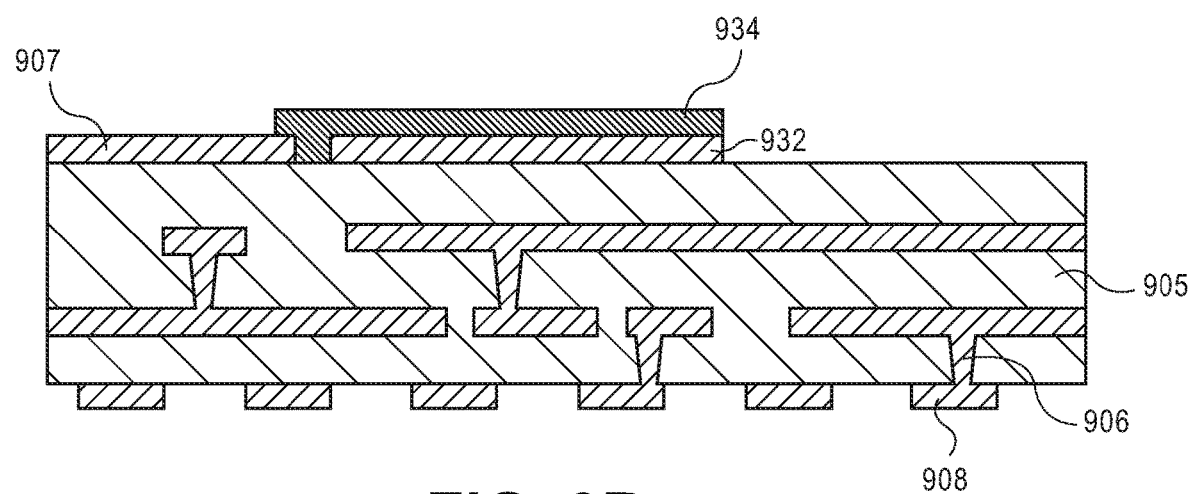
FIG. 9B is a cross-sectional illustration of the organic substrate after the piezoelectric layer has been formed, according to an embodiment of the invention.

Referring now to FIG. 9B, a piezoelectric material may be formed over the first electrode 932 to form a piezoelectric layer 934. According to an embodiment, the piezoelectric layer may be deposited in an amorphous phase. In order to improve the piezoelectric properties of the piezoelectric layer 934, the amorphous layer may be crystallized with a laser annealing process. For example, the piezoelectric layer 934 may be deposited with a sputtering process, an ink jetting process, or the like. According to an embodiment, the piezoelectric layer 934 may be PZT, KNN, ZnO, or combinations thereof. In an embodiment, the laser annealing process may be a pulsed laser anneal and implemented so that the temperature of the organic substrate 905 does not exceed approximately 260° C. For example, the pulsed laser annealing process may include the use of an excimer laser with an energy density in the range of 10-100 mJ/cm$^2$ and a pulse width in the range 10-50 nanoseconds.

Figure 9C:
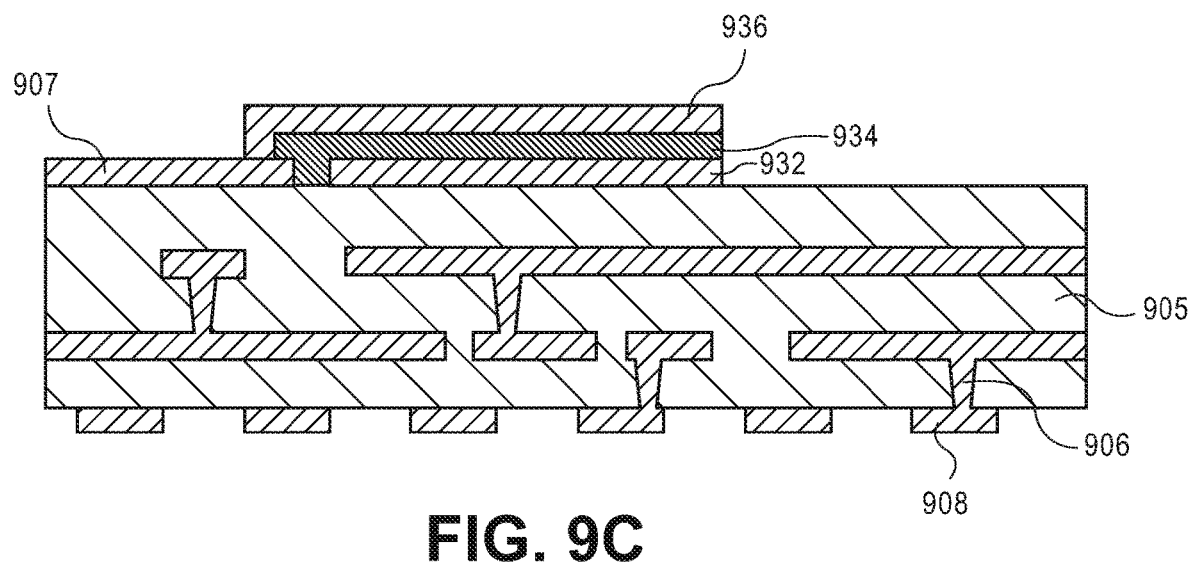
FIG. 9C is a cross-sectional illustration of the organic substrate after the second electrode has been formed, according to an embodiment of the invention.

Referring now to FIG. 9C, a second electrode 936 may be formed over the piezoelectric layer 934. According to an embodiment, the second electrode 936 may be formed with damascene processes, electrolytic plating, electroless plating, sputtering, evaporation, or other forming processes. As illustrated, the second electrode 936 may be electrically coupled to a conductive trace 907 on the organic substrate 905 that is electrically isolated from the first electrode 932. Accordingly, a voltage may be applied across the first electrode 932 and the second electrode 936. Furthermore, it is to be appreciated that additional electrodes may be formed over the piezoelectric layer 934 in order to provide additional actuation arms that allow for deflection of the actuator about more than one axis.

Figure 9D:
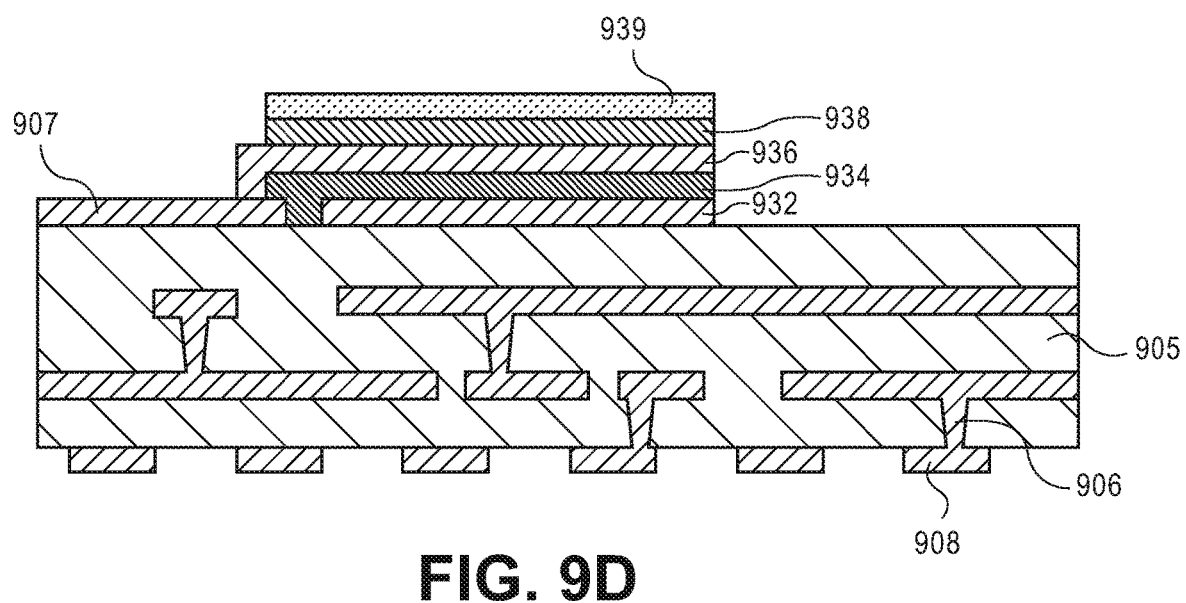
FIG. 9D is a cross-sectional illustration of the organic substrate after the reflective surface has been formed, according to an embodiment of the invention.

Referring now to FIG. 9D, a reflective surface 938 may be formed over the second electrode 936. According to an embodiment, the reflective surface 938 may be formed by depositing and patterning a layer of reflective material (e.g., silver, aluminum, tin, gold, etc.). For example, the deposition process may be a sputtering, evaporation, or other suitable deposition process that is compatible with organic substrates. In some embodiments a protective coating 939 may also be deposited over the reflective surface 938 in order to prevent oxidation or other damage.

Figure 9E:
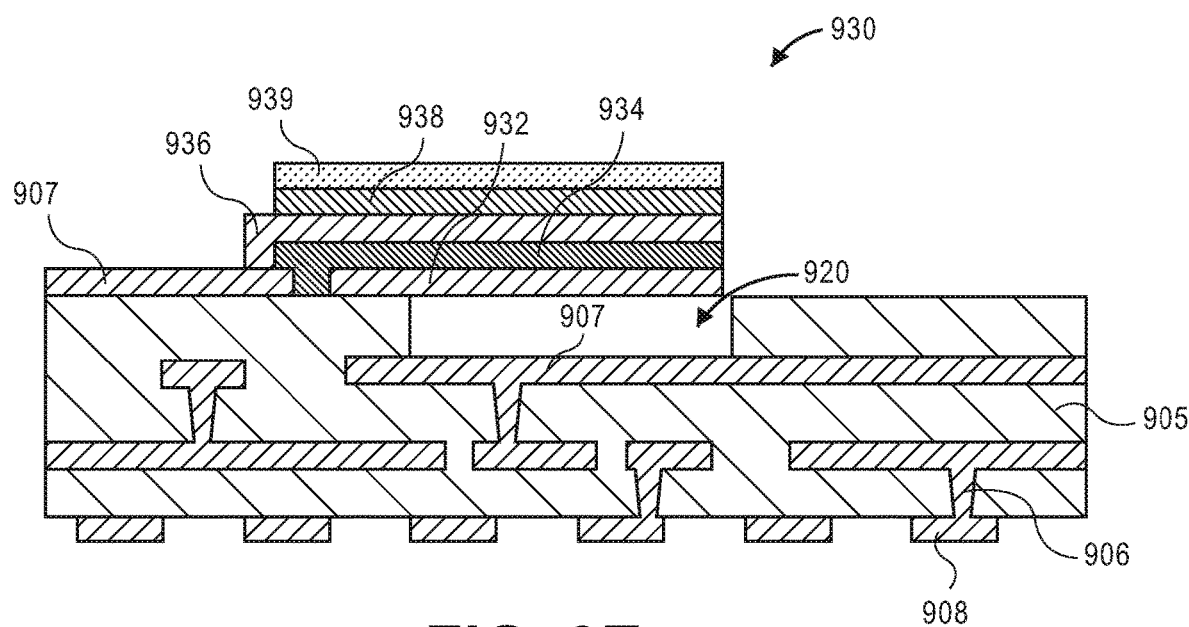
FIG. 9E is a cross-sectional illustration of the organic substrate after a cavity is formed in the organic substrate below the piezoelectrically actuated mirror, according to an embodiment of the invention.

Referring now to FIG. 9E, the piezoelectrically actuated mirror 930 is released from the organic substrate 905 in order to allow for actuation. The piezoelectrically actuated mirror 930 may be released by forming a cavity 920 below a portion of the first electrode 932. For example, the cavity may be formed with a photolithographic and etching process that selectively removes a portion of the organic substrate 905. For example, the etching process may be a reactive ion etching process, or any other wet or dry etching process. In embodiments where the pad region is too large to allow for adequate removal of the organic substrate 905 below the pad, one or more holes may be formed through the piezoelectrically actuated mirror 930 to allow for the chemistry of the etching process to pass through the piezoelectrically actuated mirror 930 and remove the organic substrate 905 below. As illustrated, embodiments may use a trace 907 as an etch-stop layer to provide the desired depth of the cavity.

While the process for forming the actuator in FIGS. 9A-9E illustrate a piezoelectrically actuated mirror with a second electrode and the piezoelectric layer substantially covering the first electrode, it is to be appreciated that substantially similar operations may be used to form any of the piezoelectrically actuated mirrors described herein. For example, the formation of the piezoelectric layer 934 and the second electrode 936 may be modified such that a portion of the first electrode 932 remains exposed and the reflective surface 938 is formed over the first electrode 932, similar to the piezoelectrically actuated mirror described with respect to FIG. 7A. Additional embodiments may include forming the mirror with a discrete die that is mounted to the piezoelectrically actuated mirror 930 instead of being deposited on an electrode. Additionally, it is to be appreciated that one or more actuation arms may be defined with the patterning and deposition processes as well.

Furthermore, it should be appreciated that forming piezoelectrically actuated mirrors on organic substrates is only one class of substrates on which the mirrors may be formed. For example, silicon or ceramic substrates may also be used in systems that include piezoelectrically actuated mirrors without the performance of the mirrors being degraded.

Figure 10:
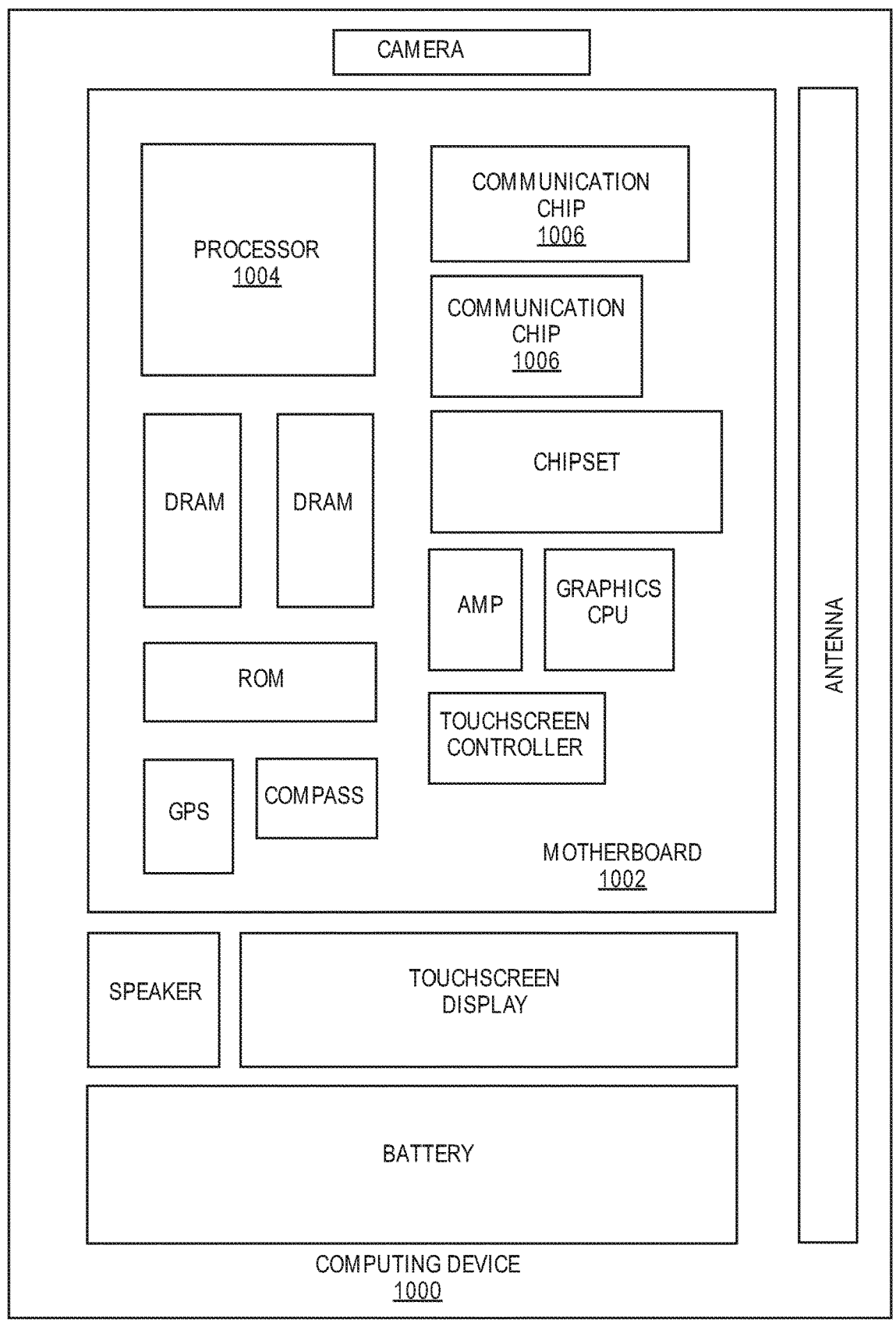
FIG. 10 is a schematic of a computing device built in accordance with an embodiment of the invention.

FIG. 10 illustrates a computing device 1000 in accordance with one implementation of the invention. The computing device 1000 houses a board 1002. The board 1002 may include a number of components, including but not limited to a processor 1004 and at least one communication chip 1006. The processor 1004 is physically and electrically coupled to the board 1002. In some implementations the at least one communication chip 1006 is also physically and electrically coupled to the board 1002. In further implementations, the communication chip 1006 is part of the processor 1004.

Depending on its applications, computing device 1000 may include other components that may or may not be physically and electrically coupled to the board 1002. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 1006 enables wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 of the computing device 1000 includes an integrated circuit die packaged within the processor 1004. In some implementations of the invention, the integrated circuit die of the processor may be used to provide driving signals for piezoelectrically actuated mirrors, in accordance with implementations of the invention. The term "processor" may refer to any device or portion of a device that processes electronic data from registers and/or memory to transform that electronic data into other electronic data that may be stored in registers and/or memory.

The communication chip 1006 also includes an integrated circuit die packaged within the communication chip 1006. In accordance with another implementation of the invention, the integrated circuit die of the communication chip may be used to provide driving signals for piezoelectrically actuated mirrors, in accordance with implementations of the invention.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Embodiments of the invention include a maskless imaging tool, comprising: a light source; and a piezoelectrically actuated mirror formed on an organic substrate and oriented to receiving light from the light source, wherein the piezoelectrically actuated mirror comprises: a first electrode extending over a cavity in the organic substrate; a piezoelectric layer formed on the first electrode; a second electrode formed on the piezoelectric layer; and a reflective surface formed on the piezoelectrically actuated mirror.

Additional embodiments include a maskless imaging tool, wherein the imaging tool is a laser direct imaging lithography (LDIL) tool.

Additional embodiments include a maskless imaging tool, further comprising: a plurality of light sources; and a plurality of piezoelectrically actuated mirrors.

Additional embodiments include a maskless imaging tool, further comprising: a single lens between the plurality of piezoelectrically actuated mirrors and a workpiece holder.

Additional embodiments include a maskless imaging tool, wherein the piezoelectrically actuated mirror is driven in a resonant frequency mode.

Additional embodiments include a maskless imaging tool, wherein the maskless imaging tool is a via-drill tool.

Additional embodiments include a maskless imaging tool, wherein the piezoelectrically actuated mirror is actuatable about two axes.

Additional embodiments include a maskless imaging tool, further comprising: a second piezoelectrically actuated mirror, wherein the first piezoelectrically actuated mirror actuates about the X-axis and the second piezoelectrically actuated mirror actuates about the Y-axis.

Additional embodiments include a maskless imaging tool, wherein the piezoelectrically actuated mirror is driven in a static mode.

Additional embodiments include a maskless imaging tool, further comprising: a plurality of light sources; a plurality of piezoelectrically actuated mirrors; and a single lens between the plurality of piezoelectrically actuated mirrors and a workpiece holder.

Additional embodiments include a maskless imaging tool, wherein each of the piezoelectrically actuated mirror includes one or more actuation arms, and wherein piezoelectrically actuated mirror is anchored to the organic substrate by the one or more actuation arms.

Additional embodiments include a maskless imaging tool, wherein a first actuation arm of the piezoelectrically actuated mirror deflects the piezoelectrically actuated mirror about a first axis and a second actuation arm of the piezoelectrically actuated mirror deflects the piezoelectrically actuated mirror about a second axis.

Additional embodiments include a maskless imaging tool, wherein a first actuation arm of the piezoelectrically actuated mirror has a first length for deflecting the piezoelectrically actuated mirror about a first axis and a second length oriented substantially perpendicular to the first length for deflecting the piezoelectrically actuated mirror about a second axis.

Additional embodiments include a maskless imaging tool, wherein the first and second electrodes are formed along the first and second lengths of the first actuation arm, a third electrode is formed on the second length of the first actuation arm, and wherein a surface area of the third electrode over the second length is greater than a surface area of the second electrode over the second length.

Embodiments of the invention include a projection system, comprising: a light source; and a piezoelectrically actuated mirror formed on an organic substrate for receiving light from the light source, wherein the piezoelectrically actuated mirror actuates in a resonant mode to provide a rastered image to a screen, wherein the piezoelectrically actuated mirror comprises: a first electrode extending over a cavity in the organic substrate; a piezoelectric layer formed on the first electrode; a second electrode formed on the piezoelectric layer; and a reflective surface formed on the piezoelectrically actuated mirror.

Additional embodiments of the invention include a projection system, further comprising: a plurality of piezoelectrically actuated mirrors for receiving light from different light sources.

Additional embodiments of the invention include a projection system, wherein each of the piezoelectrically actuated mirrors receive light from more than one light source.

Additional embodiments of the invention include a projection system, wherein each of the piezoelectrically actuated mirrors are actuatable about two axes.

Additional embodiments of the invention include a projection system, wherein the piezoelectrically actuated mirror receives light from more than one light source.

Additional embodiments of the invention include a projection system, wherein the piezoelectrically actuated mirror is actuatable about two axes.

Additional embodiments of the invention include a projection system, wherein the projection system is integrated into a pair of glasses.

Additional embodiments of the invention include a projection system, wherein a waveguide formed into a lens of the glasses guides a light beam from the light source to the piezoelectrically actuated mirror.

Additional embodiments of the invention include a projection system, wherein the piezoelectrically actuated mirror is formed on the lens, and wherein a transparent conductive trace is formed on the lens and optically coupled with the piezoelectrically actuated mirror.

Embodiments of the invention include a method of forming a piezoelectrically actuated mirror for a maskless imaging tool, comprising: forming a first electrode over an organic substrate; depositing a piezoelectric layer over the first electrode, wherein the piezoelectric layer is an amorphous layer; crystallizing the piezoelectric layer with a pulsed laser anneal, wherein a temperature of the organic substrate does not exceed 260° C.; forming a second electrode over a top surface of the piezoelectric layer; forming a reflective surface above a pad portion of the first electrode; and forming a cavity below a portion of the first electrode.

Additional embodiments of the invention include a method of forming a piezoelectrically actuated mirror for a maskless imaging tool, wherein the pulsed laser anneal is performed with an Excimer laser with an energy density in the range of approximately 10-100 mJ/cm² and pulse width in the range of approximately 10-50 nanoseconds.

What is claimed is:

1. A maskless imaging tool, comprising:
   a light source; and
   a piezoelectrically actuated mirror formed on an organic substrate and oriented to receive light from the light source, wherein the piezoelectrically actuated mirror comprises:
      a first electrode extending over a cavity in the organic substrate, wherein the first electrode has a first surface and a second surface opposite from the first surface;
      a piezoelectric layer formed on the first electrode;
      a second electrode formed on the piezoelectric layer; and
      a reflective surface formed on the piezoelectrically actuated mirror, wherein the reflective surface and the piezoelectric layer both directly contact the first surface of the first electrode.

2. The maskless imaging tool of claim 1, wherein the imaging tool is a laser direct imaging lithography (LDIL) tool.

3. The maskless imaging tool of claim 2, further comprising:
   a plurality of light sources; and
   a plurality of piezoelectrically actuated mirrors.

4. The maskless imaging tool of claim 3, further comprising:
   a single lens between the plurality of piezoelectrically actuated mirrors and a workpiece holder.

5. The maskless imaging tool of claim 2, wherein the piezoelectrically actuated mirror is driven in a resonant frequency mode.

6. The maskless imaging tool of claim 1, wherein the maskless imaging tool is a via-drill tool.

7. The maskless imaging tool of claim 6, wherein the piezoelectrically actuated mirror is actuatable about two axes.

8. The maskless imaging tool of claim 6, further comprising:
   a second piezoelectrically actuated mirror, wherein the first piezoelectrically actuated mirror actuates about the X-axis and the second piezoelectrically actuated mirror actuates about the Y-axis.

9. The maskless imaging tool of claim 6, wherein the piezoelectrically actuated mirror is driven in a static mode.

10. The maskless imaging tool of claim 6, further comprising:
    a plurality of light sources;
    a plurality of piezoelectrically actuated mirrors; and
    a single lens between the plurality of piezoelectrically actuated mirrors and a workpiece holder.

11. The maskless imaging tool of claim 1, wherein each of the piezoelectrically actuated mirror includes one or more actuation arms, and wherein the piezoelectrically actuated mirror is anchored to the organic substrate by the one or more actuation arms.

12. The maskless imaging tool of claim 11, wherein a first actuation arm of the piezoelectrically actuated mirror deflects the piezoelectrically actuated mirror about a first axis and a second actuation arm of the piezoelectrically actuated mirror deflects the piezoelectrically actuated mirror about a second axis.

13. The maskless imaging tool of claim 1, wherein a first actuation arm of the piezoelectrically actuated mirror has a first length for deflecting the piezoelectrically actuated mirror about a first axis and a second length oriented substantially perpendicular to the first length for deflecting the piezoelectrically actuated mirror about a second axis.

14. The maskless imaging tool of claim 13, wherein the first and second electrodes are formed along the first and second lengths of the first actuation arm, a third electrode is formed on the second length of the first actuation arm, and wherein a surface area of the third electrode over the second length is greater than a surface area of the second electrode over the second length.

15. A projection system, comprising:
    a light source; and
    a piezoelectrically actuated mirror formed on an organic substrate for receiving light from the light source, wherein the piezoelectrically actuated mirror actuates in a resonant mode to provide a rastered image to a screen, wherein the piezoelectrically actuated mirror comprises:
       a first electrode extending over a cavity in the organic substrate, wherein the first electrode has a first surface and a second surface opposite from the first surface;
       a piezoelectric layer formed on the first electrode;
       a second electrode formed on the piezoelectric layer; and
       a reflective surface formed on the piezoelectrically actuated mirror, wherein the reflective surface and the piezoelectric layer both directly contact the first surface of the first electrode.

16. The projection system of claim 15, further comprising:
    a plurality of piezoelectrically actuated mirrors for receiving light from different light sources.

17. The projection system of claim 16, wherein each of the piezoelectrically actuated mirrors receive light from more than one light source.

18. The projection system of claim 16, wherein each of the piezoelectrically actuated mirrors are actuatable about two axes.

19. The projection system of claim 15, wherein the piezoelectrically actuated mirror receives light from more than one light source.

20. The projection system of claim 19, wherein the piezoelectrically actuated mirror is actuatable about two axes.

21. The projection system of claim 15, wherein the projection system is integrated into a pair of glasses.

22. The projection system of claim 21, wherein a waveguide formed into a lens of the glasses guides a light beam from the light source to the piezoelectrically actuated mirror.

23. The projection system of claim 22, wherein the piezoelectrically actuated mirror is formed on the lens, and wherein a transparent conductive trace is formed on the lens and optically coupled with the piezoelectrically actuated mirror.

24. A method of forming a piezoelectrically actuated mirror for a maskless imaging tool, comprising:
    forming a first electrode over an organic substrate, wherein the first electrode has a first surface and a second surface opposite from the first surface;

depositing a piezoelectric layer over the first electrode, wherein the piezoelectric layer is an amorphous layer;

crystallizing the piezoelectric layer with a pulsed laser anneal, wherein a temperature of the organic substrate does not exceed 260° C.;

forming a second electrode over a top surface of the piezoelectric layer;

forming a reflective surface above a pad portion of the first electrode, wherein the reflective surface and the piezoelectric layer both directly contact the first surface of the first electrode; and forming a cavity in the organic substrate below a portion of the first electrode.

25. The method of claim 24, wherein the pulsed laser anneal is performed with an Excimer laser with an energy density in the range of approximately 10-100 mJ/cm$^2$ and pulse width in the range of approximately 10-50 nanoseconds.

* * * * *